(12) United States Patent  
Travis

(10) Patent No.: US 8,297,165 B2  
(45) Date of Patent: Oct. 30, 2012

(54) LOAD REDUCING STORES LAUNCH TUBE

(75) Inventor: Matt H. Travis, Fall City, WA (US)

(73) Assignee: The Boeing Company, Chicago, IL (US)

( * ) Notice: Subject to any disclaimer, the term of this patent is extended or adjusted under 35 U.S.C. 154(b) by 80 days.

(21) Appl. No.: 13/011,721

(22) Filed: Jan. 21, 2011

(65) Prior Publication Data

US 2012/0118212 A1   May 17, 2012

Related U.S. Application Data

(60) Continuation-in-part of application No. 12/548,824, filed on Aug. 27, 2009, now Pat. No. 7,905,169, which is a division of application No. 11/701,304, filed on Jan. 31, 2007, now Pat. No. 7,597,038.

(51) Int. Cl.
*B64D 1/04* (2006.01)
*F41A 21/00* (2006.01)
*F42B 10/56* (2006.01)

(52) U.S. Cl. ............... 89/1.51; 89/1.53; 89/1.54; 89/29; 89/1.35; 89/1.801; 89/1.802; 89/1.804; 102/386; 102/395; 102/342; 102/357

(58) Field of Classification Search .................. 89/1.51, 89/1.53, 1.54, 29, 1.35, 1.801, 1.802, 1.804, 89/1.809, 1.81; 102/386, 395, 342, 357; 42/1.14

See application file for complete search history.

(56) References Cited

U.S. PATENT DOCUMENTS

| | | | |
|---|---|---|---|
| 4,069,761 A | 1/1978 | Jimenez | |
| 4,263,835 A | 4/1981 | Dragonuk | |
| 4,333,384 A | 6/1982 | Arnold | |
| 4,441,674 A | 4/1984 | Holtrop | |
| 4,475,436 A | 10/1984 | Campbell | |
| 4,498,368 A | 2/1985 | Doane | |
| 4,608,907 A | 9/1986 | Ellis et al. | |
| 4,637,292 A | 1/1987 | Peterson | |
| 4,642,928 A | 2/1987 | Bertiller et al. | |
| 4,681,013 A | 7/1987 | Farley et al. | |
| 4,791,854 A | 12/1988 | Banicevic | |
| 4,850,553 A | 7/1989 | Takata et al. | |
| 4,944,226 A | 7/1990 | Wedertz et al. | |
| 4,962,798 A | 10/1990 | Ferraro et al. | |
| 4,964,595 A | 10/1990 | Nordhaus | |
| 4,974,796 A | 12/1990 | Carr et al. | |
| 5,029,776 A | 7/1991 | Jakubowski et al. | |
| 5,222,996 A | 6/1993 | Marshall et al. | |
| 5,359,917 A | 11/1994 | Travor | |
| 5,365,913 A | 11/1994 | Walton | |

(Continued)

*Primary Examiner* — Michael David
(74) *Attorney, Agent, or Firm* — Toler Law Group

(57) ABSTRACT

Apparatuses, vehicles, and methods to reduce loads applied to a store when the store is launched from the vehicle are disclosed. A particular apparatus includes a launch chamber and a flap. The launch chamber has a first portion configured to receive a store. A second portion is configured to be positioned over an opening in a hull of a vehicle. The chamber has a forward end and an aft end. The flap is positioned a distance from the aft end of the launch chamber. The flap has a first end rotatably mounted proximate to the first portion of the launch chamber and has a second end extending toward the second portion of the launch chamber. The flap is configured to rotate about the first end when the store impacts the flap due to the forces applied to the store by the fluid when the store is launched.

20 Claims, 22 Drawing Sheets

U.S. PATENT DOCUMENTS

| | | |
|---|---|---|
| 5,429,053 A | 7/1995 | Walker |
| 5,904,323 A | 5/1999 | Jakubowski et al. |
| 6,073,886 A | 6/2000 | Jakubowski et al. |
| 6,234,062 B1 | 5/2001 | Griffin |
| 6,318,230 B1 | 11/2001 | Bamber |
| 6,481,669 B1 | 11/2002 | Griffin |
| 6,499,407 B2 | 12/2002 | Brum |
| 6,591,534 B1 | 7/2003 | Trudeau et al. |
| 6,619,178 B1 | 9/2003 | Fransson et al. |
| 6,679,454 B2 * | 1/2004 | Olsen et al. ............ 244/137.1 |
| 7,062,875 B1 | 6/2006 | Stevens et al. |
| 7,093,802 B2 | 8/2006 | Pitzer et al. |
| 7,421,934 B1 | 9/2008 | Madulka et al. |
| 7,597,038 B2 * | 10/2009 | Travis ............ 89/1.51 |
| 7,905,169 B2 * | 3/2011 | Travis ............ 89/1.51 |
| 2002/0189432 A1 | 12/2002 | Facciano et al. |
| 2008/0178729 A1 | 7/2008 | Travis |
| 2010/0083816 A1 * | 4/2010 | Travis ............ 89/1.51 |

* cited by examiner

LOAD REDUCING STORES LAUNCH TUBE

CLAIM OF PRIORITY

This continuation-in-part application claims priority from U.S. patent application Ser. No. 11/701,304, filed on Jan. 31, 2007, and issued as U.S. Pat. No. 7,597,038 entitled "LOAD REDUCING STORES LAUNCH TUBE," and U.S. patent application Ser. No. 12/548,824, filed on Aug. 27, 2009, also entitled "LOAD REDUCING STORES LAUNCH TUBE," both of which are incorporated herein by reference in their entirety.

GOVERNMENT RIGHTS

Embodiments were made with Government support under Agreement No. N00019-04-C-3146 awarded by the Naval Air Systems Command. The Government has certain rights therein.

BACKGROUND

Stores, such as sonobuoys and countermeasures, can be deployed from vehicles, such as aircraft, surface ships, and submarines, in a variety of manners. As an example, to minimize loads on a sonobuoy during deployment, some aircraft launch systems are oriented such that stores are ejected at an aft swept angle to reduce incident air loads. This orientation, however, can cause interference with structural members and, increase the weight of the launcher system. Therefore, launching at 90 degrees is desirable. As a further example in the case of sonobuoys, it is desirable to store a sonobuoy in its Sonobuoy Launch Container (SLC), thereby extending shelf life of the sonobuoy, and to eject the sonobuoy directly from the SLC.

The SLC is larger in diameter than the sonobuoy itself, and the sonobuoy rests on a bottom plate of the SLC. For store deployment from an SLC to occur, both the sonobuoy and the bottom plate must be ejected through a sonobuoy launch tube before departing an aircraft. The diameter of the sonobuoy launch tube must be large enough to accommodate the bottom plate (that has a diameter that is larger than the diameter of the sonobuoy). As a result, desirable load-reducing tolerances nominally close to diameter of the sonobuoy can not be maintained, and the sonobuoy can rotate within the sonobuoy launch tube during transit.

These rotations occur due to airloads that laterally push on the sonobuoy as it begins to emerge from the sonobuoy launch tube at the bottom of the aircraft. For example, an airstream force is roughly proportional to an exposed portion of the store. As the buoy rotates and clearances are taken up, contact with the launch tube will occur at the aft bottom edge of the launch tube and upper leading edge of the launch tube, causing local shear and moment loads. A friction force also occurs at these upper and lower bearing surfaces.

The airloads do not keep the buoy to one side, but can cause multiple impacts to occur as the sonobuoy bangs repeatedly into the sonobuoy launch tube during exit. These impacts can possibly result in shock loading outside of levels for which the sonobuoys are qualified.

Some attempts have been made to deal with problems associated with loading on sonobuoys during launch. For example, sonobuoys are launched from P-3C Orion maritime patrol aircraft at around a 55 degree angle from vertical to avoid buoy load problems. As discussed above, use of an angled launch system can cause interference with structural members and can increase weight of the launcher system. In other air vehicles, such as the Nimrod, sonobuoys are removed from their sonobuoy launch containers and are vertically launched from smaller-diameter launch tubes.

The foregoing examples of related art and limitations associated therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems and methods which are meant to be exemplary and illustrative, not limiting in scope. In various embodiments, one or more of the problems described above in the Background have been reduced or eliminated, while other embodiments are directed to other improvements.

Apparatuses, vehicles, and methods are disclosed to reduce loads applied to a store when the store is launched. A launch chamber may include a flap that is movably mounted within the launch chamber and that is shaped to engage sides of the store. As the store moves into the launch chamber, loads caused by fluid forces resulting from a flow of ambient fluid act on the store. The movably mounted flap moves or deforms to absorb some of the load. The flap may be movably mounted by mounting the flap at one end to the launch chamber with a flat spring or other flexible member. As the store moves into the fluid, potentially causing the store to rotate within the launch chamber, the flap engages the store to prevent the store from impacting sides of the launch chamber or other parts of the vehicle. Once the store has been launched into the fluid, the flap resumes its original position in the launch chamber.

In a particular illustrative embodiment, an apparatus includes a launch chamber and a flap. The launch chamber has a first portion configured to receive a store. A second portion is configured to be positioned over an opening in a hull of a vehicle. The chamber has a forward end and an aft end. The flap is positioned a distance from the aft end of the launch chamber. The flap has a first end rotatably mounted proximate to the first portion of the launch chamber and has a second end extending toward the second portion of the launch chamber. The flap is configured to rotate about the first end when the store impacts the flap due to the forces applied to the store by the fluid when the store is launched.

In another particular illustrative embodiment, a vehicle includes a hull, a stores launcher, a launch tube, a launch chamber, and a flap. The stores launcher is configured to launch at least one store. The launch tube is configured to receive the store from the stores launcher. The launch chamber has a first portion configured to receive the store from the launch tube. The launch chamber also has a second portion configured to be positioned over an opening in the hull. The flap is positioned a distance from the aft end of the launch chamber. The flap is movably mounted within the launch chamber. The flap is configured to rotate about the first end when the store impacts the flap due to the forces applied to the store by the fluid when the store is launched.

In still another illustrative embodiment, a method of launching a store is disclosed. A store is launched from a stores launch chamber toward an ambient atmosphere. The ambient atmosphere includes a fluid. The stores launch chamber has a first end to receive the store and a second end open to the ambient atmosphere. In response to at least a portion of the store contacting the fluid, the store is received against a flap rotatably mounted within the launch chamber. The flap is configured to rotate about the first end when the store impacts the flap due to the forces applied to the store by the fluid when the store is launched.

In addition to the exemplary embodiments and aspects described above, further embodiments and aspects will become apparent by reference to the drawings and by study of the following detailed description.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Given by way of overview, in an exemplary embodiment, an apparatus for launching stores includes a flap that is movably mounted within a launch chamber and that is shaped to engage sides of a store. As the store moves into the launch chamber, load caused by fluid forces from an ambient fluid act on the store. The flap permits the store to move, both in translation and rotation, as the store is launched. The flap moves or deforms to engage the store along its surface to prevent impact between the store and an edge of the launch chamber or another rigid surface as the store is being launched. The flap may be movably mounted by mounting the flap at one end to the launch chamber with a flat spring or other flexible member. As the store moves into the fluid, potentially causing the store to rotate within the launch chamber, the flap continues to engage the store. The flap prevents the store from impacting sides of the launch chamber or other parts of a vehicle from which the store is launched. Once the store has been launched into the fluid, the flap resumes its original position in the launch chamber. Details of exemplary embodiments and aspects thereof will be discussed below.

Figure 1A:
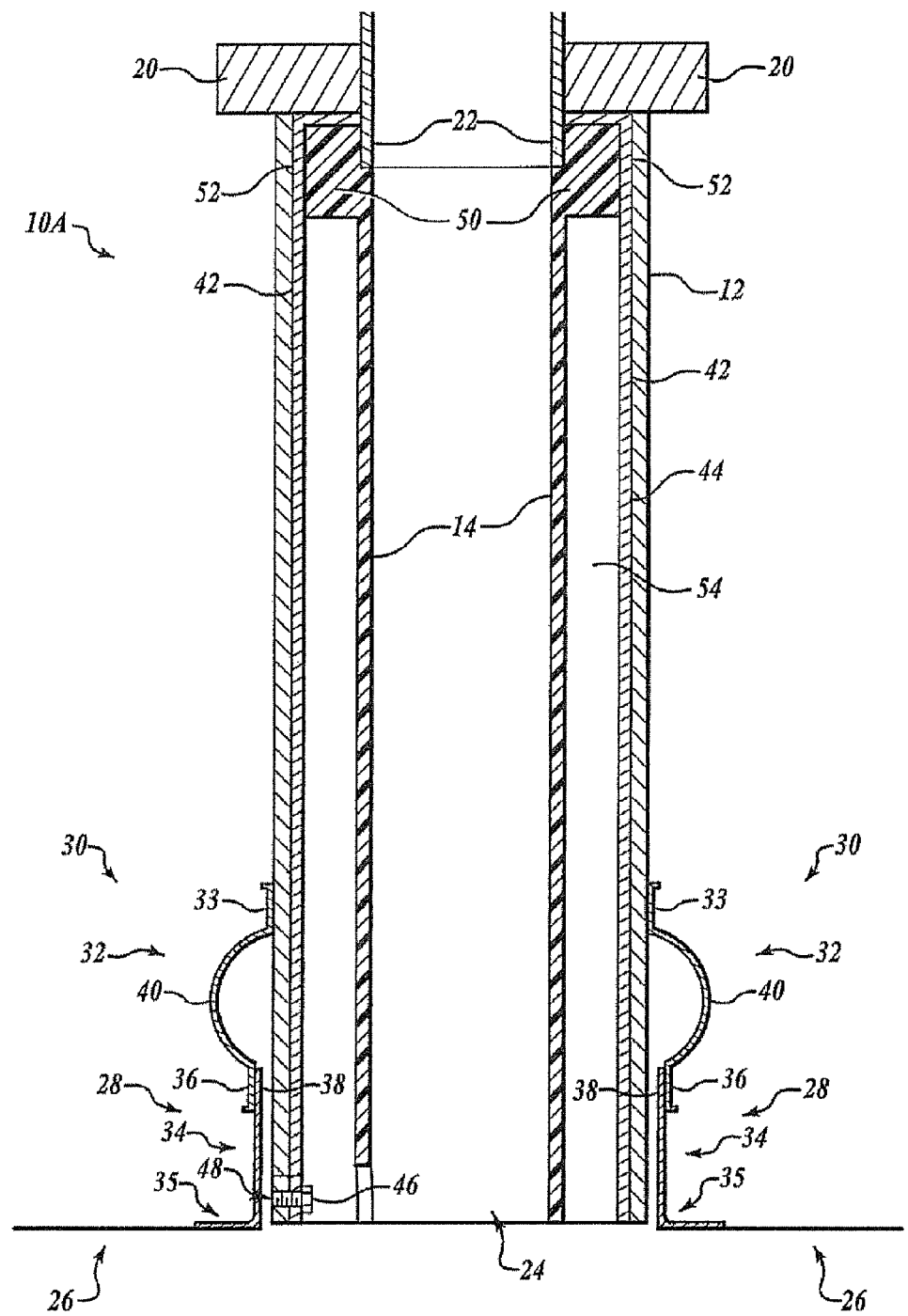
FIGS. 1A and 1B are cross-sectional side views of exemplary embodiments of stores launch tubes.

Referring now to FIG. 1A, a stores launch tube 10A includes an outer tube 12 and an inner tube 14. The inner tube 14 is disposed interior the outer tube 12 and is configured to reduce load as a store (not shown) exits therefrom.

The stores launch tube 10A is a lower portion of a stores launch tube assembly that also includes an upper tube portion 18 that is attached to a stores launcher (not shown) and a normally shut gate valve 20. The gate valve 20 is disposed toward a bottom end 22 of the upper tube portion 18. The gate valve 20 operates in conjunction with a stores launcher (not shown) and opens to permit the store (not shown) to be ejected from an opening 24 in an outer mold line 26 of a vehicle (not shown) by the stores launcher.

The outer tube 12 can serve multiple functions. For example, the outer tube 12 can serve to provide backup stiffness for hung store loads which are generally higher than normal launch loads, can provide for longitudinal deflections due to vehicle deflections, and can also provide a seal for pressure loads induced by opening and closing the gate valve 20 within the tube at various altitudes. The outer tube 12 is a pressure boundary between the interior of the stores launcher and ambient environment. As such, the outer tube 12 has a thickness and is made of a material as desired for a particular application. Material selection for the outer tube 12 may also depend in part on corrosion considerations (such that dissimilar metal galvanic corrosion is mitigated). For example, when the vehicle is an aircraft and the ambient environment is air, the outer tube 12 may be made of aluminum, steel, or the like. When the vehicle is a surface ship and the ambient environment is seawater, the outer tube 12 may be made of steel or the like. When the vehicle is a submarine and the ambient environment is seawater under high pressure, the outer tube 12 may be made of steel, high-strength steel such as HY-80, titanium, or the like.

The outer tube 12 includes a flexible pressure seal 28. The pressure seal 28 is located toward a lower portion 30 of the outer tube 12. The pressure seal 28 extends around the entire periphery of the exterior of the lower portion 30 of the outer tube 12. An exemplary, non-limiting example of the pressure seal 28 is described below. An upper portion 32 of the pressure seal 28 is attached, such as by welding, at an attachment portion 33 to the exterior of the lower portion 30 of the outer tube 12. A lower portion 34 of the pressure seal 28 is attached, such as by welding, at an attachment portion 35 to the outer mold line 26 exterior the opening 24.

An overlapping portion 36 of the upper portion 32 of the pressure seal 28 is urged against an overlapping portion 38 of the lower portion 34 of the pressure seal in sealing engagement, thereby maintaining a pressure seal and acting as a pressure barrier. The overlapping portion 36 is urged in sealing engagement against the overlapping portion 38 by a biasing portion 40 of the upper portion 32. The overlapping portions 36 and 38 are maintained in sealing engagement with each other but are able to slide along each other. This sliding, sealing engagement maintains a pressure barrier while accommodating relative motion between the outer tube 12 and the outer mold line 26. Such relative motion may arise due to pressure variations as the vehicle changes altitude in air or changes depth in water, or as the vehicle performs maneuvers that exert forces on the outer tube 12 or the outer mold line 26.

The inner tube 14 is disposed interior the outer tube 12 and is configured to reduce load as a store (not shown) exits therefrom. In an exemplary embodiment, the inner tube 14 is able to reduce load because the inner tube 14 is made of flexible material and can flex, which distributes load over more of the buoy surface, and also reduces shock to the buoy by lengthening the duration of the restoring impulse from collision with the wall of the launch tube. Given by way of non-limiting example, the flexible material used for the inner tube 14 may include such flexible materials as an acetal homopolymer like DELRIN™, available from DuPont; a polytetrafluroethylene (PTFE) like TEFLON™, available from DuPont, or HOSTAPLON™, or CUFLON™; or a fluorocarbon such as a tetrafluroethylene (TFE) fluorocarbon like any of several formulations of RULON™. Other flexible materials may be used as desired for a particular application, provided that the flexible material provides a coefficient of friction sufficiently low enough to permit a store (not shown) to travel without binding through the inner tube 14.

In an exemplary embodiment, the inner tube 14 may be provided as part of a unit, such as a canister 42, that can be easily replaced. For example, the inner tube may be received within the canister 42 that has an outer casing 44 that is attachable to the outer tube 12. The canister 42 may be made of any material as desired, such as for example aluminum, steel, or the like. In an exemplary embodiment, the casing 44 may be held in place by one or more fasteners 46 that are securely received (such as threadedly received) in an opening 48 (such as a threaded opening) in the outer tube 12. The opening 48 may be located near the outer mold line 26 in order to provide for ease of access when installing or removing the canister 42.

The inner tube 14 is attached at an attachment portion 50 to an interior of the canister 42 at an upper portion 52 of the canister 42. In an exemplary embodiment, the attachment portion 50 is bonded to the upper portion 52 of the canister 42 with an adhesive that is appropriate for a desired application. Suitable types of adhesives depend on the type of flexible launch tube material chosen.

Flexing of the inner tube 14 is accommodated by an interstitial chamber 54 between the inner tube 14 and the casing 44. The interstitial chamber provides a space through which the inner tube 14 can flex unimpeded as the store (not shown) emerges from the opening 24 and rotates due to forces exerted on the store by slipstream forces.

Figure 1B:
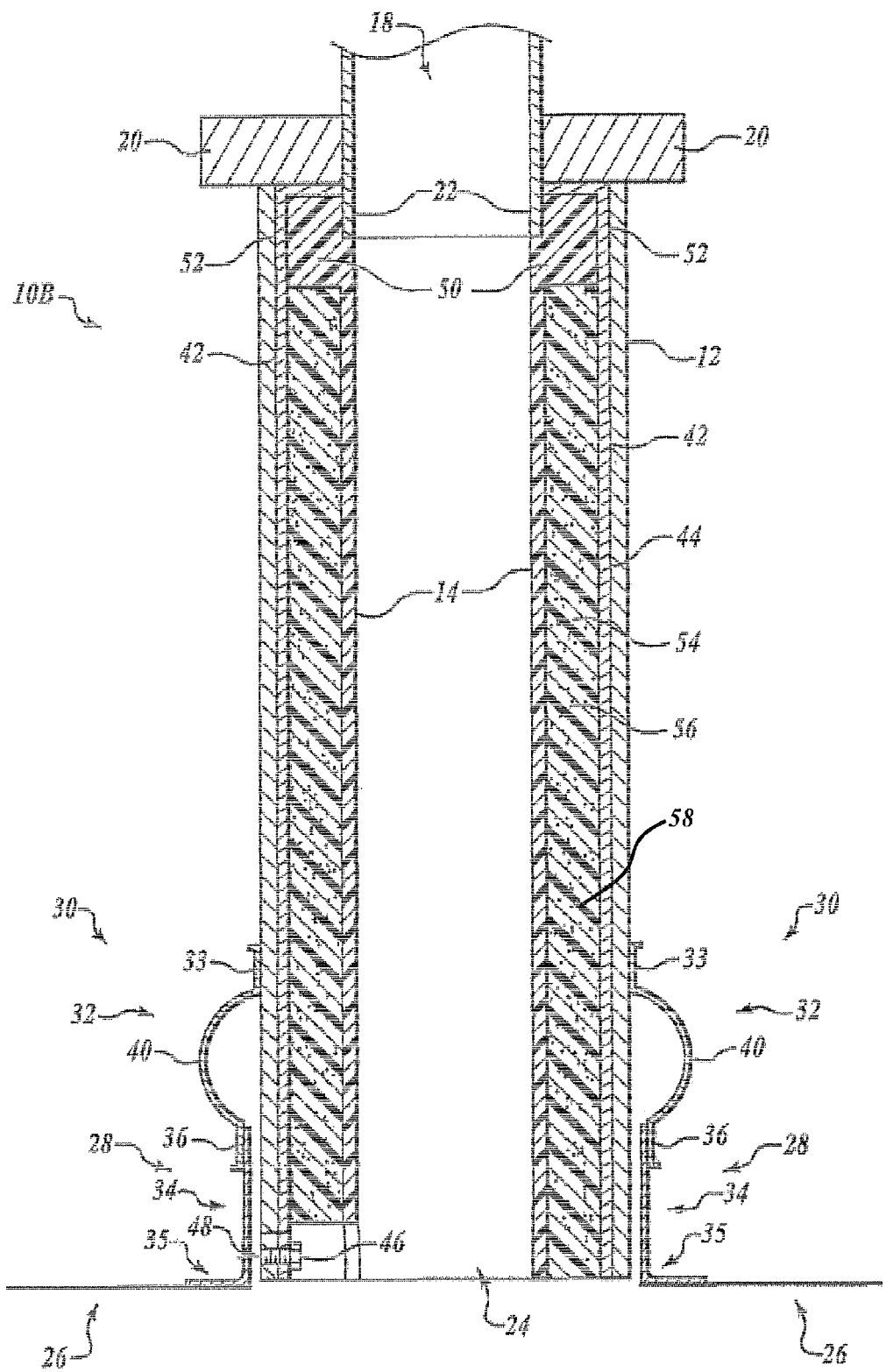

Referring now to FIG. 1B, an exemplary stores launch tube 10B includes all of the features of the stores launch 10A (FIG. 1A), but the interstitial chamber 54 optionally is at least partially filled with a soft filler material 56, such as foam. If provided, the filler material 56 can help provide spring-like and energy dissipative qualities and/or can help reduce voids between the inner tube 14 and the outer tube 12, depending on the mechanical properties of the filler material 56 selected. Filling the interstitial chamber 54 with the filler material 56 can enhance the function of the inner tube 14, or not affect it at all, as desired. For example, certain types of filler material 56, such as foam, can provide more stiffness and/or dampening to the inner tube 14, if desired. Alternatively, other types of filler material 56 can be selected which do not affect stiffness or dampening of the inner tube 14, but which do fill the interstitial chamber 54 at least partially so foreign objects—which could substantially affect flexing capability of the inner tube 14—do not enter the interstitial chamber 54. To that end, the interstitial chamber 54 need not be completely filled with the filler material 56, if provided. The interstitial chamber 54 may be sealed sufficiently with the filler material 54 being provided just in a lower portion 58 of the interstitial chamber 54. Alternatively, other means such a flexible membrane may be used to afford a seal between the inner tube 14 and the outer tube 12, or between the inner tube 14 and the outer casing 44. Like reference numbers are used to denote features of the stores launch tube 10B in common with the stores launch tube 10A (FIG. 1A), and their details need not be repeated for an understanding of the embodiment.

Figure 2A:
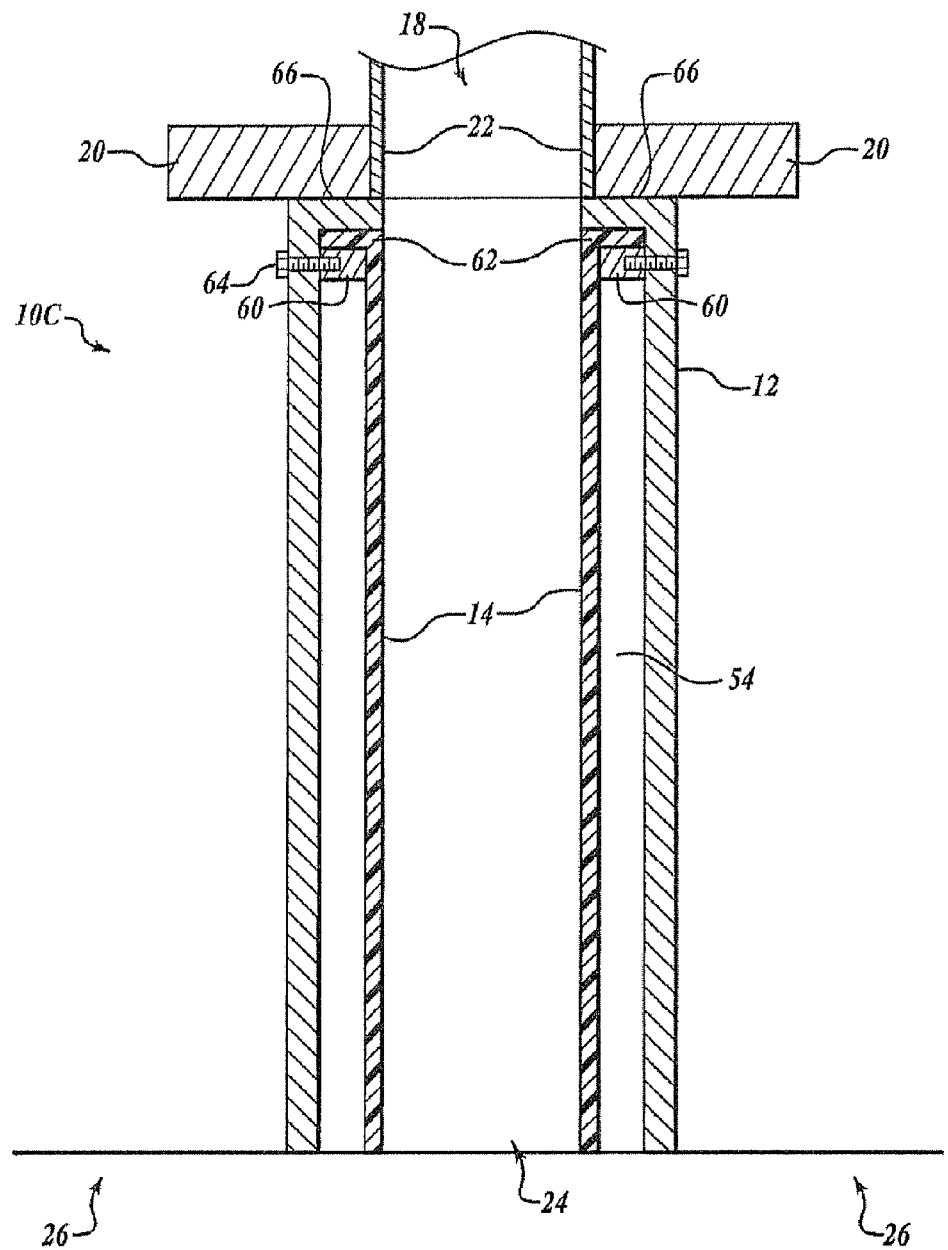
FIGS. 2A, 2B, and 2D are cross-sectional views of further exemplary embodiments of stores launch tubes.

Referring now to FIG. 2A, a stores launch tube 10C includes an outer tube 12 and an inner tube 14. The inner tube 14 is disposed interior the outer tube 12 and is configured to reduce load as a store (not shown) exits therefrom. The stores launch tube 10C includes many features in common with the stores launch tube 10A (FIG. 1A) that are indicated by like reference numbers, and their details need not be repeated for an understanding of the embodiment. Unlike the stores launch tube 10A (FIG. 1A), in the stores launch tube 10C the inner tube 14 retained within the outer tube 12 without use of a unit such as the canister 42 (FIG. 1A). For example, an indexed retention ring 60 may be disposed within the inner tube 14 under an upper flange 62 of the inner tube 14. The indexed retention ring 60 is fastened against the outer tube 12 with fasteners 64. Fastening the indexed retention ring 60 against the outer tube 12 holds the upper flange 62 of the inner tube 14 securely against an upper flange 66 of the outer tube 12.

Figure 2B:
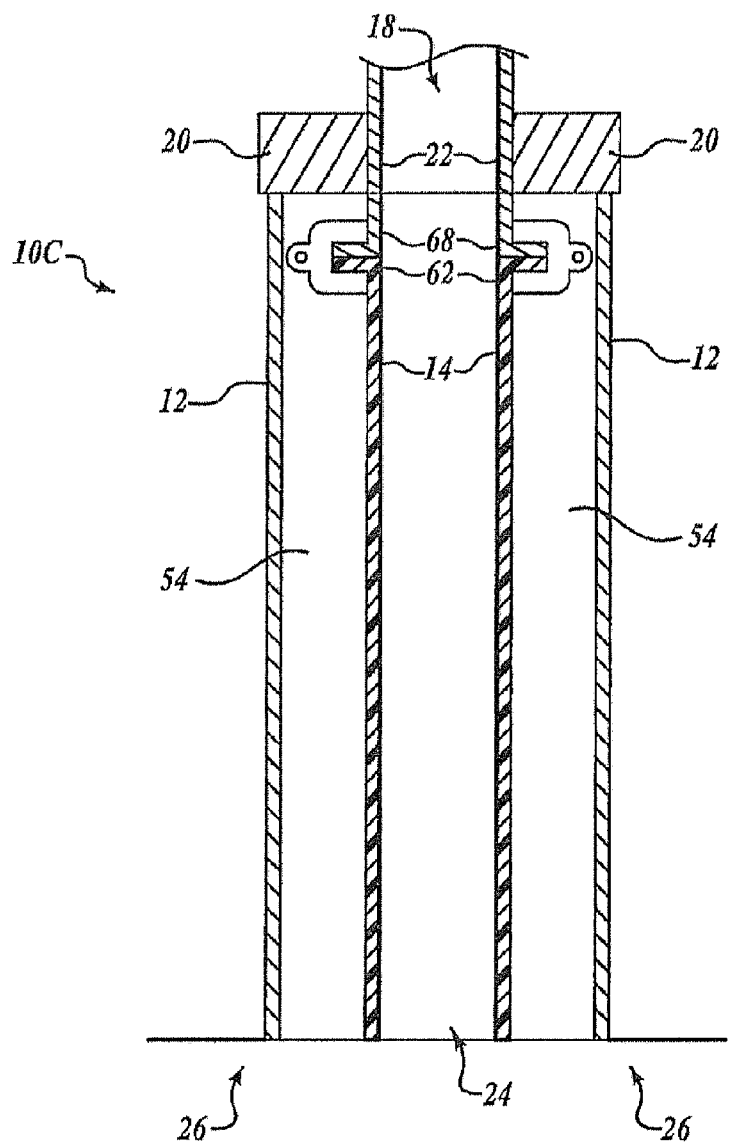
Figure 2C:
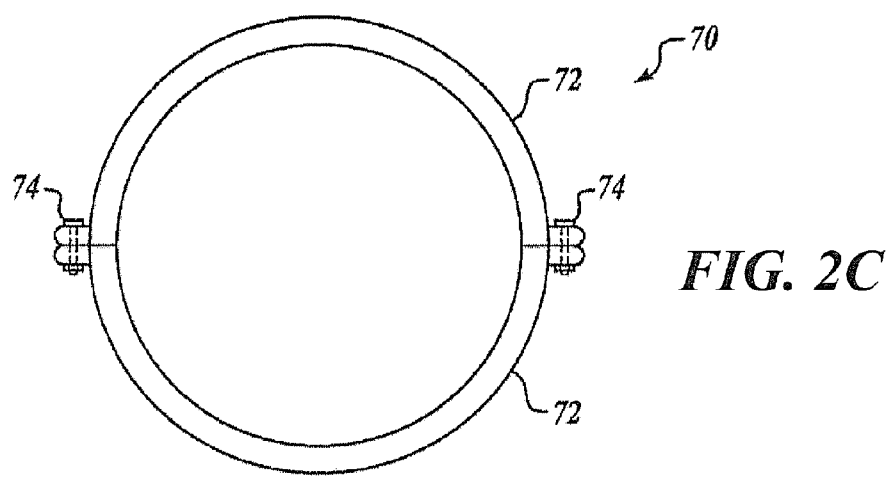
FIG. 2C is a top view of a portion of the stores launch tube of FIG. 2B.

Referring now to FIGS. 2B and 2C, the upper flange 62 of the inner tube 14 instead may be held securely against a lower flange 68 of the lower portion 22 of the upper tube portion 18 by a bracket 70. The bracket 70 may include two bracket members 72 that each extend around half of the periphery of the exteriors of the flanges 62 and 68. The bracket members are held together securely by fasteners 74.

Figure 2D:
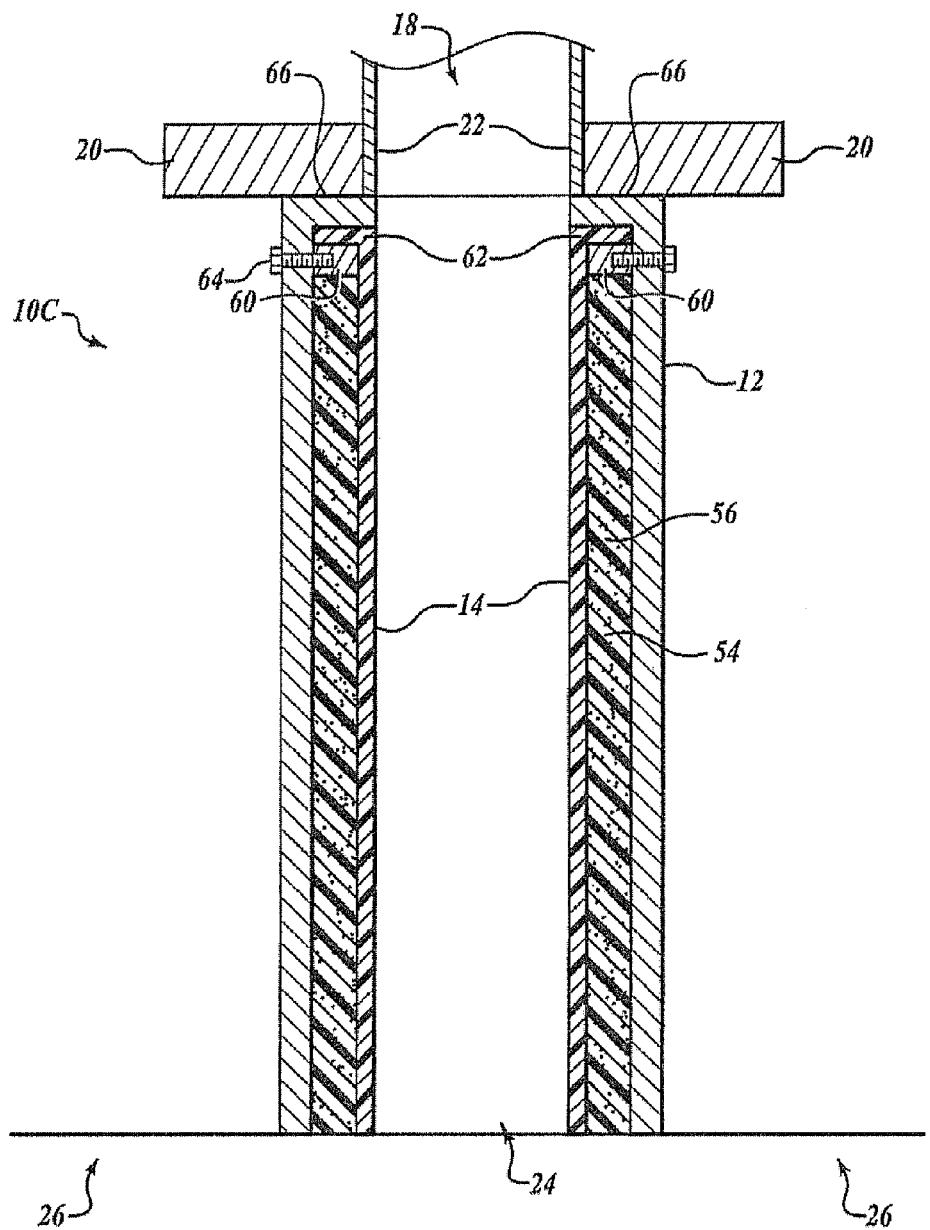

Referring now to FIG. 2D, an exemplary stores launch tube 10D includes all of the features of the stores launch 10C (FIG. 2A), but the interstitial chamber 54 optionally is at least partially filled with the soft filler material 56, as described above. As discussed above, the interstitial chamber 54 need not be completely filled with the filler material 56, if provided. The interstitial chamber 54 may be sealed sufficiently with the filler material 54 being provided just in a lower portion 58 of the interstitial chamber 54. Like reference numbers are used to denote features of the stores launch tube 10D in common with the stores launch tube 10C (FIG. 2A), and their details need not be repeated for an understanding of the embodiment.

Referring now to FIGS. 3A through 3F, various embodiments of stores launch tubes may have various cross-sections, as desired for a particular application. While the outer tube 12 has been illustrated in the drawings, by way of non-limiting examples, as having either a circular cross-section or an oval cross-section, it is not intended that the outer tube 12 be limited to circular or oval cross-sections. No limitation whatsoever is intended regarding the cross-section of the outer tube 12. Thus, the outer tube 12 can have any cross-section shape as desired that is consistent with the outer tube 12 performing its functions, such as providing backup stiffness for hung store loads which are generally higher than normal launch loads, or providing for longitudinal deflections due to vehicle deflections, or for providing a seal for pressure loads induced by opening and closing the gate valve 20 within the tube at various altitudes. With this context in mind and referring now to FIG. 3A, the outer tube 12 and the inner tube 14 of the stores launch tube 10A each suitably have a substantially circular cross section and each are made of one-piece construction.

Figure 3A:
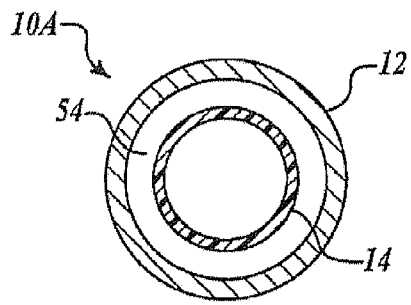
FIGS. 3A, 3B, 3C, 3D, 3E, 3F, 3G, and 3H are cross-sectional top views of the exemplary stores launch tubes of FIGS. 1A, 1B, 2A, 2B, and 2D.
Figure 3B:
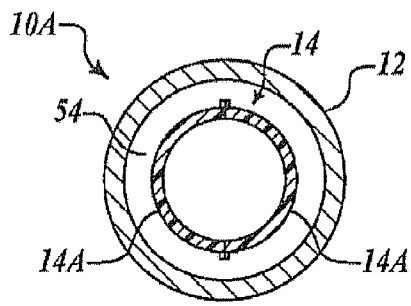

Referring now to FIG. 3B, the outer tube 12 and the inner tube 14 of the stores launch tube 10A each suitably have a substantially circular cross section. The outer tube 12 is made of one-piece construction. If desired, the inner tube may be made of more than one piece. To that end, the inner tube 14 can be made of sections 14A. Given by way of non-limiting example, the sections 14A may be multiple segments with differing properties, as desired, or portions of a tube or tubes sliced longitudinally. While two of the sections 14A are illustrated by way of non-limiting example, the number of the sections 14A is not intended to be limited whatsoever. Any number of the sections 14A may be used as desired to make up the inner tube 14.

Figure 3C:
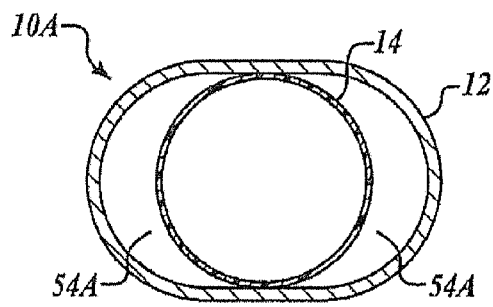

Referring now to FIG. 3C, the outer tube 12 and the inner tube 14 of the stores launch tube 10A each suitably are made of one-piece construction. The inner tube 14 has a substantially circular cross section. If desired, the outer tube 12 has a substantially oval cross section. In this case, the exterior of the inner tube 14 abuts the interior of the outer tube 12. This arrangement creates two substantially crescent-shaped interstitial chambers 54A. Thus, a more slender (albeit slightly elongated) cross section than that illustrated in FIG. 3A can be obtained. Use of a substantially oval cross section for the outer tube 12 may be desired in the event of interference with structural members or other nearby systems or subsystems, or to achieve stiffness and or dampening effects limited by and/or tailored to the direction of load reduction only.

Figure 3D:
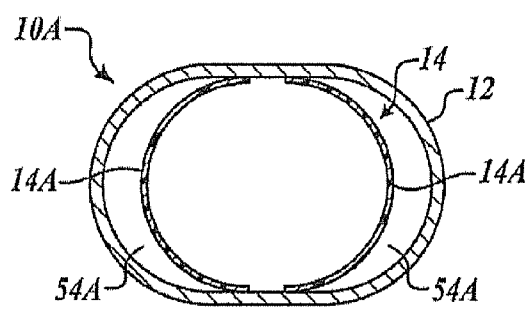
Figure 3E:
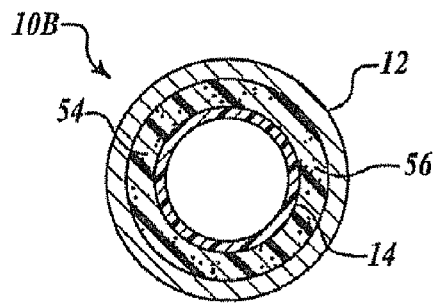
Figure 3F:
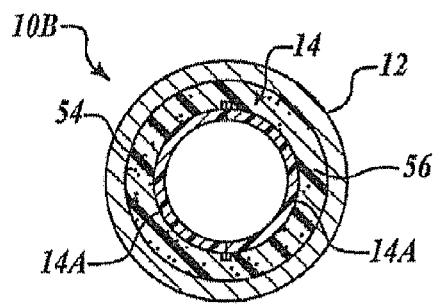
Figure 3G:
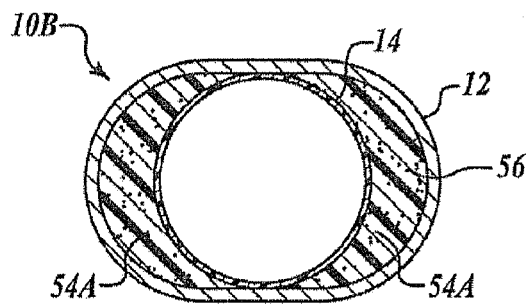
Figure 3H:
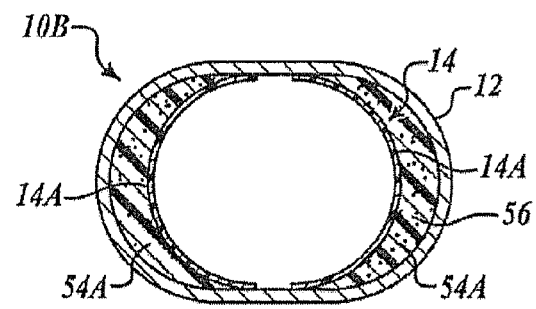

Referring now to FIG. 3D, the outer tube 12 suitably is made of one-piece construction and has a substantially oval cross section (as illustrated in FIG. 3C). The inner tube 14 has a substantially circular cross section but is made of the sections 14A. While two of the sections 14A are illustrated by way of non-limiting example, the number of the sections 14A is not intended to be limited whatsoever. Any number of the sections 14A may be used as desired to make up the inner tube 14.

Referring now to FIGS. 3E, 3F, 3G, and 3H, the cross sections of the outer tube 12 and the inner tube 14 are the same as those illustrated in FIGS. 3A, 3B, 3C, and 3D, respectively. However, the interstitial chambers 54 or 54A, as appropriate, are at least partially filled with the filler material 56, as described above.

Figure 4C:
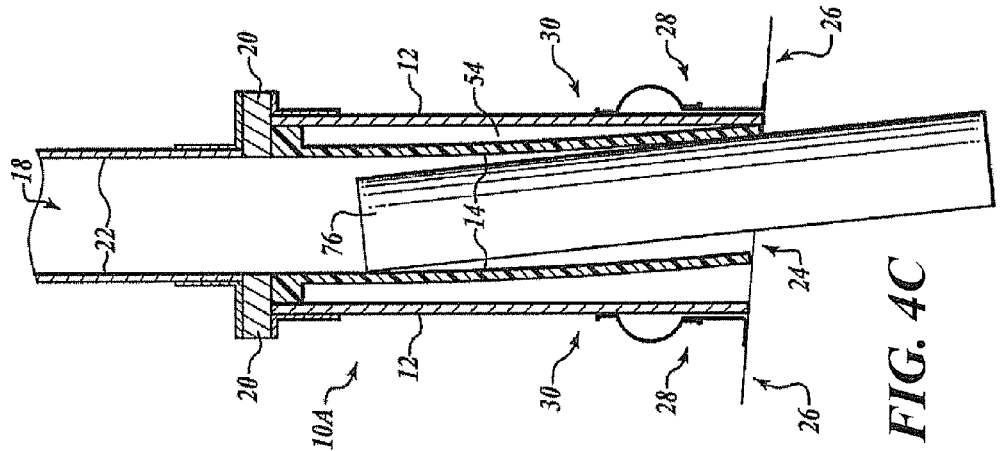
FIGS. 4A, 4B, and 4C illustrate operation of an exemplary stores launch tube.
Figure 4B:
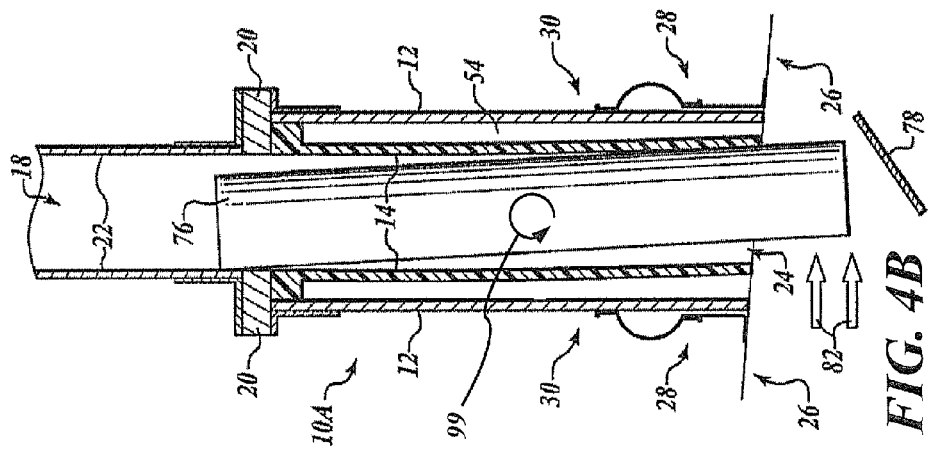
Figure 4A:
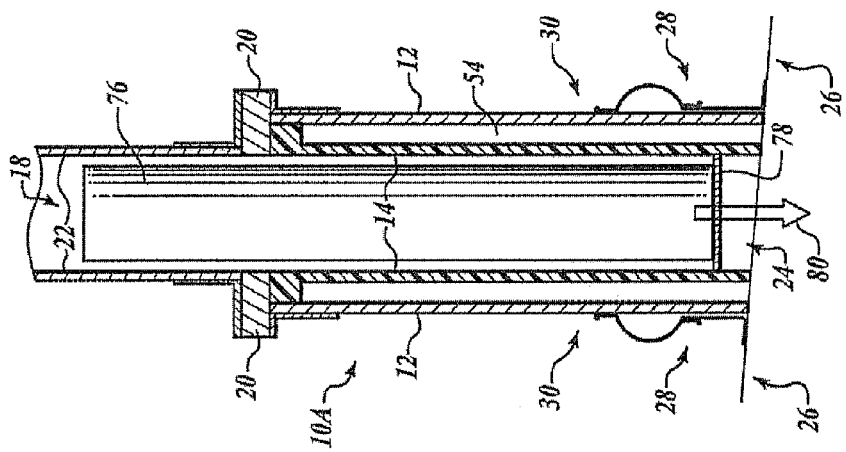

Referring now to FIGS. 4A, 4B, and 4C, embodiments operate as follows. As shown in FIG. 4A, the gate valve 20 has been opened, and a store 76, such as a countermeasure or a sonobuoy resting on a bottom plate 78 of its sonobuoy launch container (not shown), descends through the upper tube portion 18 and the stores launch tube 10A, as shown by an arrow 80.

As shown in FIG. 4B, the store 76 begins to emerge from the stores launch tube 10A through the opening 24 at the outer mold line 26. The bottom plate 78 (in the case of a sonobuoy that is launched from its sonobuoy launch container) falls away from store 76. Slipstream forces, indicated by arrows 82, cause the store 76 to begin to rotate (in a fore-aft manner, represented by a rotation axis 99) within the stores launch tube 10A. When the store 76 has rotated sufficiently, it first contacts a lower, aft portion of the inner tube 14, thereby resulting in a bearing stress on the store 76. Because the inner tube 14 is made of flexible material, as described above, the inner tube 14 flexes rearwardly at lower portions of the inner tube 14 responsive to the fore-aft rotation of the store 76. In this manner, rearward flexing of the lower portions of the inner tube 14 can help reduce bearing stress on the store 76.

As shown in FIG. 4C, the store 76 continues to rotate in a fore-aft manner and the store 76 contacts an upper, forward portion of the inner tube 14, thereby resulting in impact shock loads on the store 76. Because the inner tube 14 is made of flexible material, as described above, the inner tube 14 can help reduce the impact shock loads. In addition, the inner tube 14 may flex forwardly at portions of the inner tube 14 near the area of impact with the store 76 responsive to the fore-aft rotation of the store 76. In this manner, forward flexing of portions of the inner tube 14 can help reduce impact shock loads on the store 76.

Figure 5A:
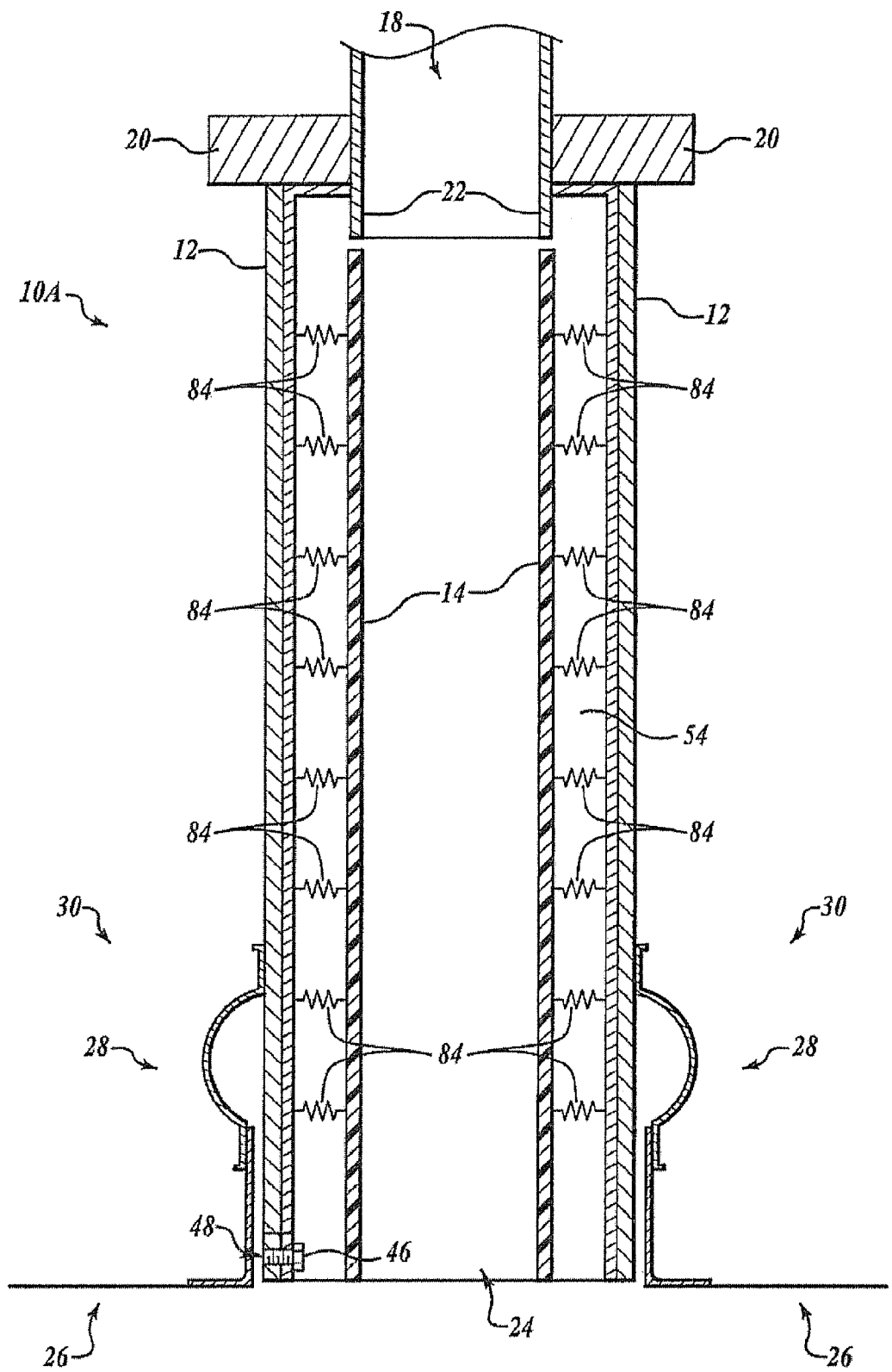
FIGS. 5A, 5B, 5C, and 5D illustrate exemplary load-reducing features.
Figure 5B:
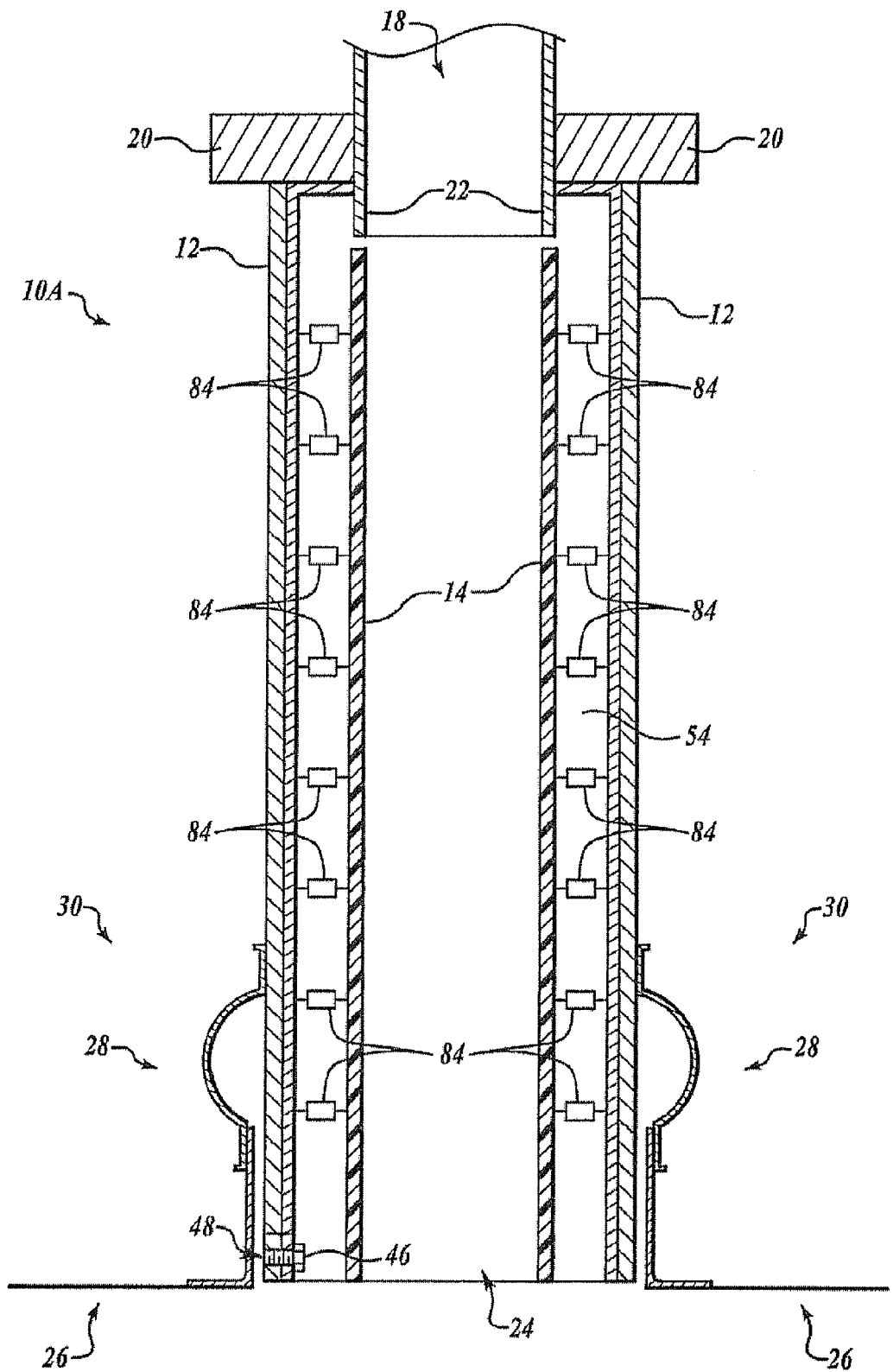
Figure 5C:
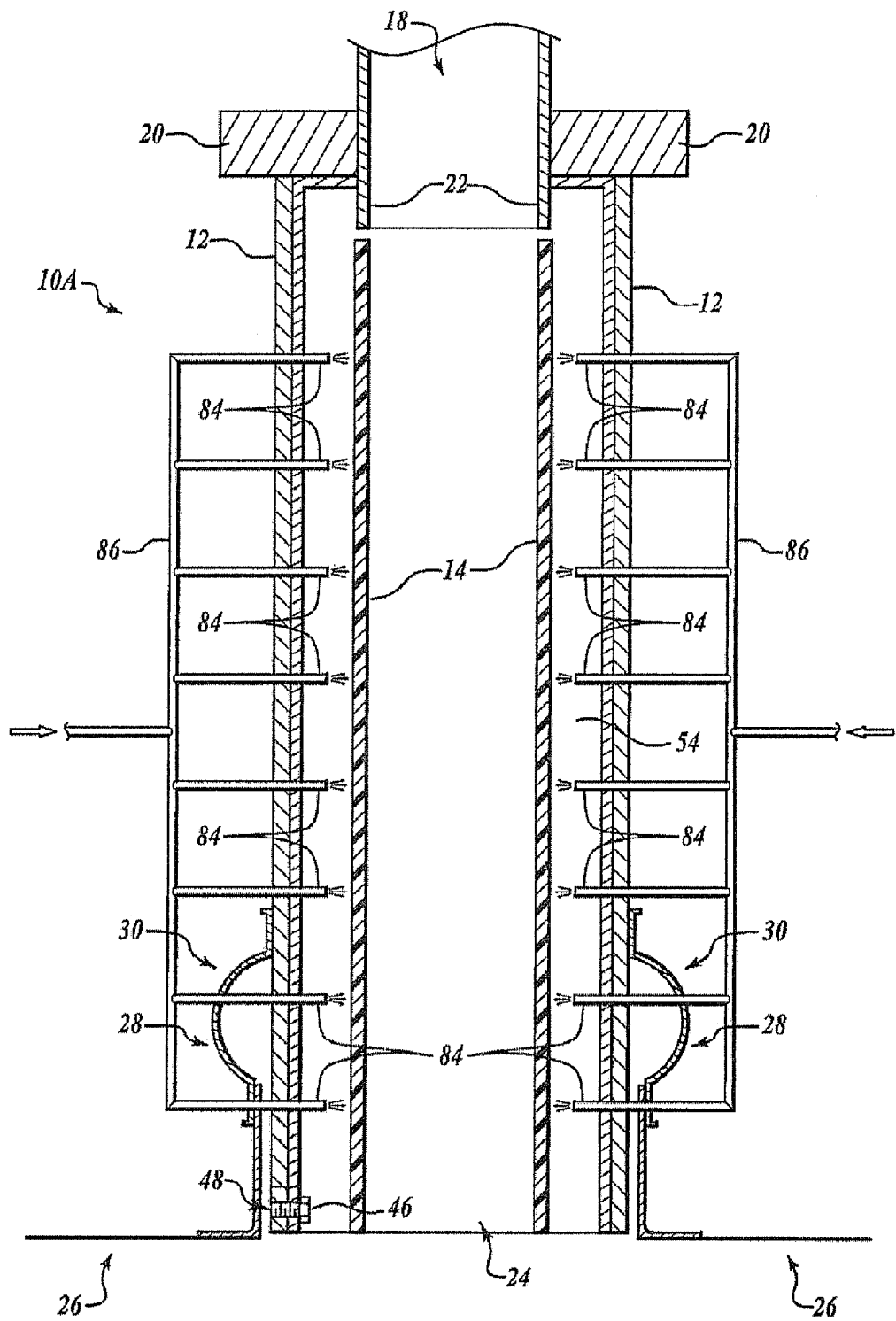

Referring now to FIGS. 5A, 5B, and 5C, at least one load-reducing device 84, such as a spring, a piston, or a jet, may be disposed between the inner tube 14 and the outer tube 12. The inner tube 14 should not be rigidly attached, but instead should be permitted to move freely, restrained only by the load reducing device 84. A load-reducing device 84 may be disposed between an upper, forward portion of the inner tube 14 and the outer tube 12 to reduce impact shock loads on the store (not shown), and another load-reducing device 84 may be disposed between a lower, rearward portion of the inner tube 14 and the outer tube 12 (that is, at a radial position that is around 180 degrees from the load-reducing device at the upper, forward portion of the inner tube 14). However, as many of the load-reducing devices 84 may be provided as desired for a particular application.

Figure 5D:
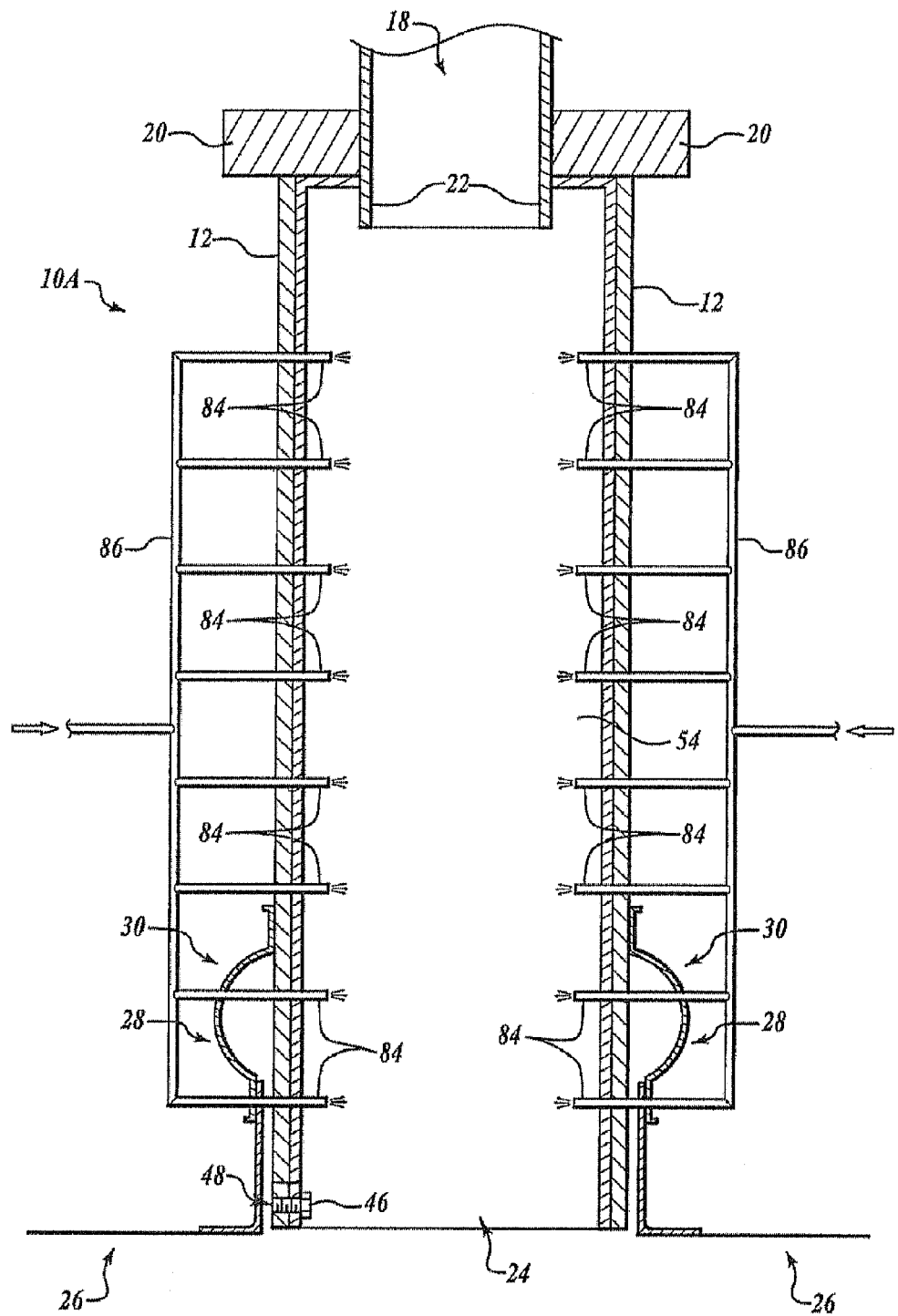

Any type of load-reducing device may be used as desired for a particular application. Given by way of non-limiting example and without any intention of limitation, the load-reducing devices 84 may be provided in the form of springs (FIG. 5A), a spring-like material such as foam (not shown), pistons (FIG. 5B), fluid jets (FIG. 5C), or the like. As shown in FIG. 5C, a source of fluid (not shown) provides the fluid to a manifold 86. Jets 84 receive the fluid from the manifold 86. The fluid may be selected as desired for a particular application. For example, a gas such as air or an inert gas may be used as the fluid when the vehicle is an aircraft or a surface ship or a submarine. A gaseous fluid as described above or a liquid such as water or seawater may be used as the fluid when the vehicle is a surface ship or a submarine. Use of water or seawater as the fluid would provide for quieter operation for a submarine than use of a gaseous fluid (because gas bubbles would eventually collapse due to sea pressure, thereby causing cavitation-like noise). As shown in FIG. 5D, in another embodiment that includes the jets 84 no inner tube is necessary. In this embodiment, the outer tube 12 provides the pressure boundary and the jets 84 perform load-reduction functions of an inner tube.

The load-reducing devices 84 can reduce bearing stress and impact shock loads in addition to load reduction provided by the inner tube 14 when the inner tube 14 is made of a flexible material. If desired, the load-reducing devices 84 can reduce bearing stress and impact shock loads in lieu of load reduction provided by the inner tube 14 when the inner tube 14 is not made of a flexible material. In such a case, the inner tube 14 can be made of any material as desired for a particular application, such as aluminum, steel, titanium, or the like.

While the load-reducing devices 84 are illustrated in use with the stores launch tube 10A, the load-reducing devices 84 can be used with any embodiment as desired. For example, the load reducing devices can be used with the stores launch tube 10B (FIG. 1B) and the stores launch tube 10D (FIG. 2D) when the filler material 56 (FIGS. 1B and 2D) does not interfere with the load-reducing devices 84—such as when the filler material 56 serves only to seal the bottom of the interstitial chamber 54 (FIGS. 1B and 2D). Alternatively, the filler material 56 can serve as an enhancement to the stores launch tube 10A by providing tailored stiffness and/or dampening.

Figure 6:
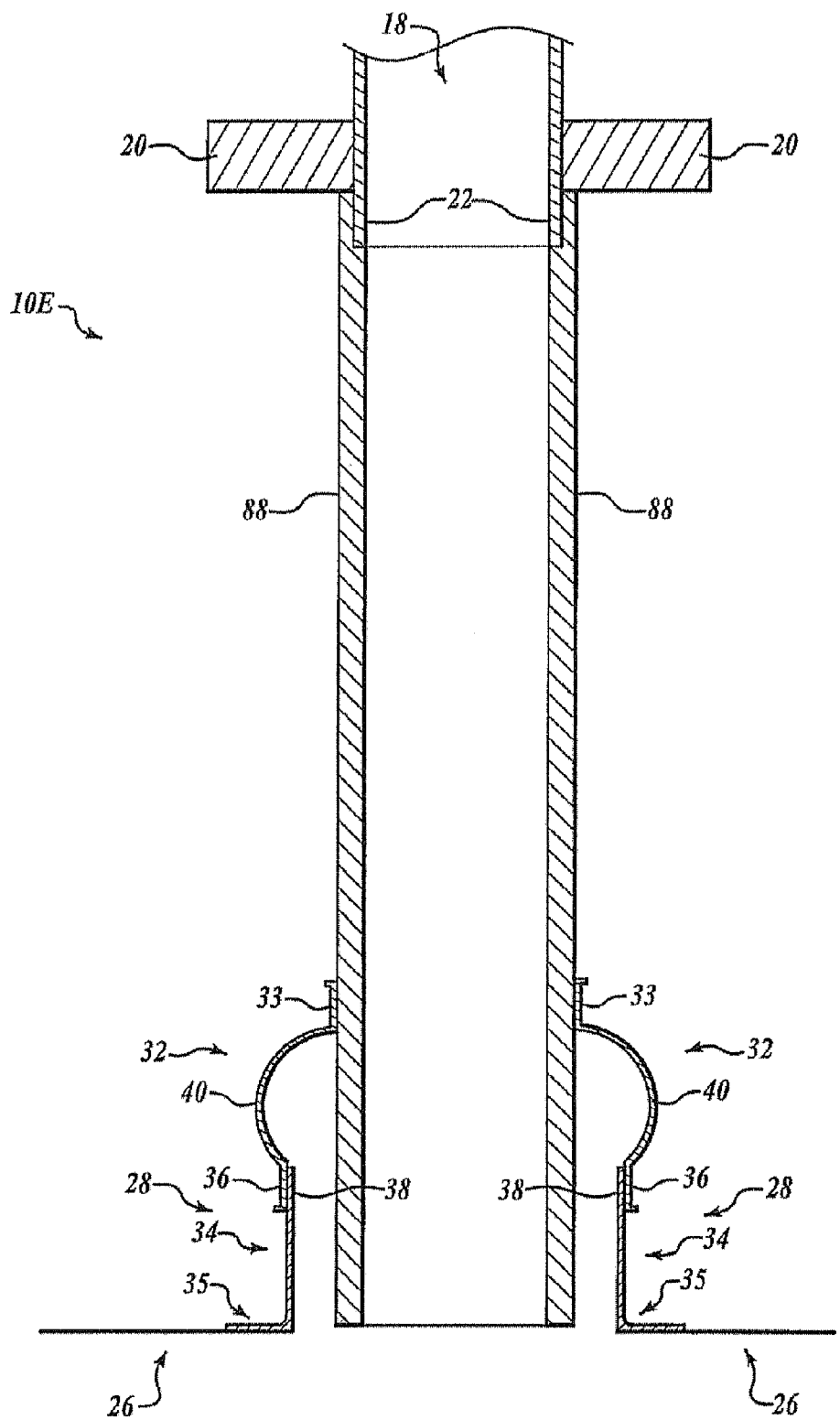
FIG. 6 is a cross-sectional side view of another exemplary stores launch tube.

Referring now to FIG. 6, a stores launch tube 10E includes a tube member 88 that is configured to reduce load as a store (not shown) exits therefrom. The stores launch tube 10E includes many features in common with the stores launch tube 10A (FIG. 1A) that are indicated by like reference numbers, and their details need not be repeated for an understanding of the embodiment. Unlike the stores launch tube 10A (FIG. 1A), in the stores launch tube 10E only the tube member 88 is provided. That is, the stores launch tube 10E need not have a separate outer tube and inner tube. Instead, the stores launch tube 10E includes a tube member 88 that is configured to reduce load as a store exits therefrom. The flexible seal 28 is coupled to an exterior of the tube member 88 and is arranged to cooperate with the tube member 88 to act as a pressure barrier to an ambient environment. In such an exemplary embodiment, a separate outer tube and a separate inner tube are not needed, and their functions can instead be satisfied with the single tube member 88 which can perform the functions related to impact and stress loading, hung store loading, and pressure differential loading. To that end, the tube member 88 is configured to flex as a store (not shown) exits therefrom, as described above for the inner tube 14 (FIG. 1A), while also meeting any or all other functions previously assigned to the outer tube 12 (FIG. 1A), such as acting as a pressure barrier, permitting axial movement, and providing adequate stiffness for hung store loads. For example, the stores launch tube 10E could provide both soft (load relieving) and hard (hung store) stiffness attributes if a material with nonlinear stiffness characteristics is used for the tube member 88, or through geometric considerations in tube construction. For example, bilinear stiffness could be achieved with a soft material encased by a stiff material with a gap between them. It will be appreciated that any of the functions performed by an outer tube can alternatively be performed by a single tube with no loss of functionality. In such a case, manufacturing costs and/or ease of production may help determine which approach is more desirable in a given application.

Figure 7:
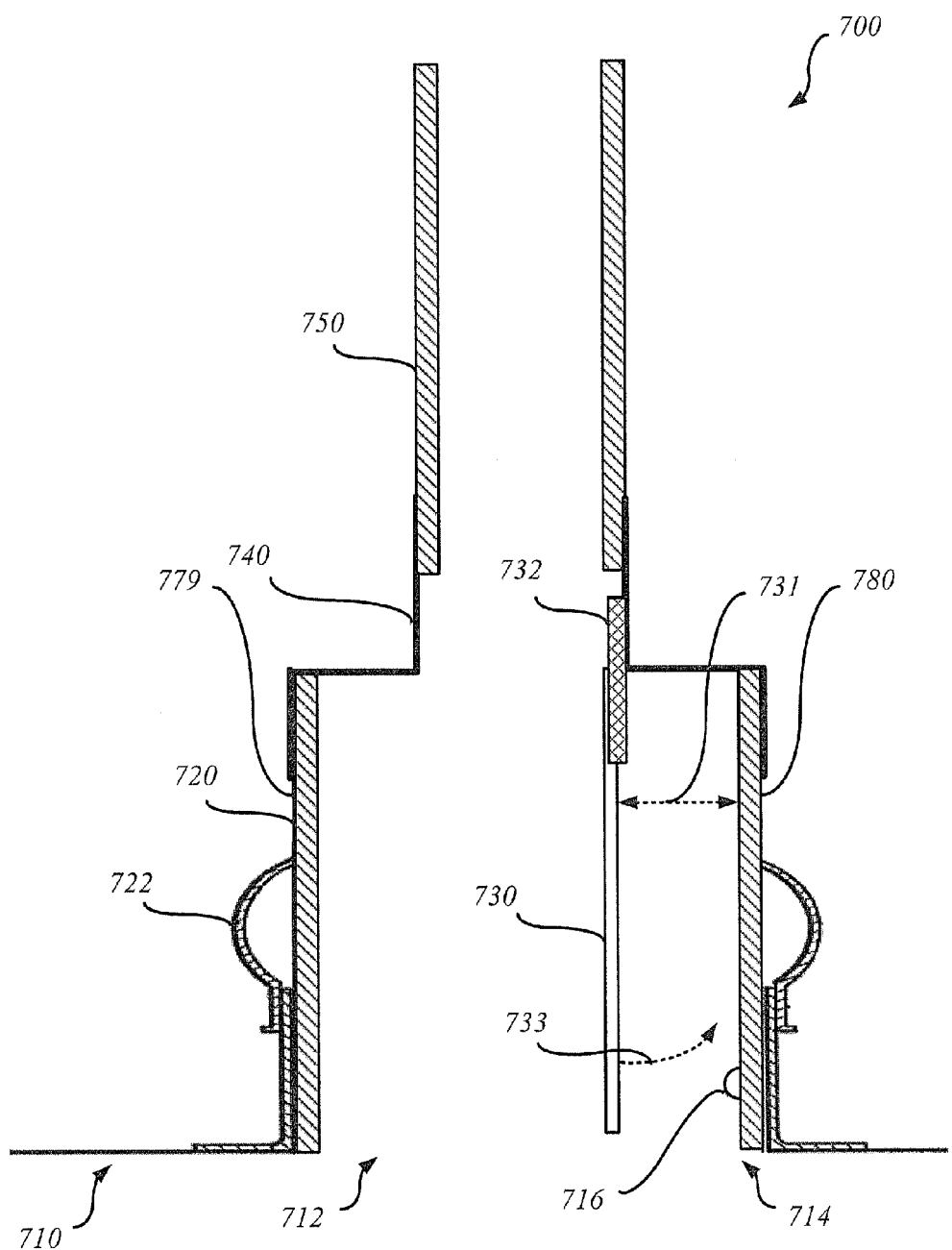
FIG. 7 is a cross-sectional side view of another exemplary stores launch tube.

Referring now to FIG. 7, an exemplary embodiment of a launch system 700 may include a launch chamber 720 and a flap 730. The launch chamber 720 may be positioned over an opening 712 in a vehicle hull 710 and may be configured to receive a store (not shown in FIG. 7) from a launch tube 750. The launch chamber 720 has a forward end 779 and an aft end 780. The launch chamber 720 may be sealed against the vehicle hull 710 by a boot or seal 722 to maintain integrity of the vehicle hull 710. The launch tube 750 may receive a store from a stores launcher, such as described below with reference to FIG. 12. The launch tube 750 may be coupled to the launch chamber 720 via an interface fitting 740. Joined into a single unit by the interface fitting 740, the launch tube 750 may be regarded as an upper launch tube and the launch chamber 720 may be regarded as a lower launch tube. In one embodiment, the interface fitting 740 may include a gate valve interface fitting that provides a valve to seal the launch tube 750 (or upper launch tube) from the opening 712 in the vehicle hull 710. The gate valve may seal a stores launcher (not shown in FIG. 7) and other portions of an interior of the vehicle hull 710 from an atmosphere outside the vehicle hull 710.

The flap 730 may be movably mounted within the launch chamber 720. The flap 730 may be rotatably coupled via a flexible member or flat spring 732 to the interface fitting 740 or another structure at the upper portion of the launch chamber 720. According to one particular illustrative embodiment, the flap 730 is joined at one end to a flexible member, such as a flat spring 732. The flat spring 732, in turn, may be secured to a structure within the launch chamber 720 such as, for example, the interface fitting 740. For example, the flat spring 732 may be formed of a flexible material designed to deform but to resume its original shape, such as a portion of metal. The flat spring 732 flexes to enable movement of the flap 730. Specifically, the flat spring 732 flexes at a point between ends where the flat spring is attached to the flap 730 and to a structure within the launch chamber 720 to absorb at least a portion of the load applied to the store, as further explained with reference to FIGS. 9A-9D.

The flat spring 732 and the flap 730 may be welded, riveted, or otherwise suitably attached to one another. At an end opposite the flap 730, the flat spring 732 may be welded, riveted, or otherwise suitably attached to the interface fitting 740 or another body within the launch tube 750 or the launch chamber 720. The flat spring 732 and the flap 730 may be coupled to one another and to the launch chamber 720 so as not to interfere with or impede the movement of a store received from the launch tube 750. The flap 730 and the flat spring 732 may be coupled in a manner selected to avoid protrusions extending from the flap 730 or the flat spring 732 that might mar or damage the store (not shown in FIG. 7) as it is launched from the launch tube 750 and through the launch chamber 720 toward the opening 712 in the vehicle hull. The store may rotate as it is moving through the launch chamber 720 due to forces applied to the store by the ambient fluid flow, thus, it may be desirable for the launch chamber 720 to have a larger cross-section from fore to aft than from side to side to facilitate the rotation of the store.

The flap 730 may be movably mounted within the launch chamber 720 by attaching the flap 730 to the launch chamber 720 at a distance 731 from an aft end 714 of the launch chamber 720 and the opening 712 in the vehicle hull 710. Mounting the flap 730 in such a way may allow the flap 730 to rotate or to deform about its attachment point in the launch chamber 720. Thus, as a store (not shown in FIG. 7) is launched through the launch chamber 720, forces acting on the store, such as loads caused by fluid forces caused by a flow of fluid striking an end of the load, may be partially absorbed by movement 733 of the flap 730 toward the aft end 714 of the launch chamber 720. The flap 730 and the flat spring 732 thus support the store as it is discharged. The flat spring 732 may be configured to inhibit movement of the flap 730 to prevent a distal end of the flap 730 (e.g., a second end of the flap 730 opposite a first end of the flap coupled to the flat spring 732) from striking the launch chamber 720 or an edge of the opening 712 in the vehicle hull 710. The flap 730 is movably mounted within the launch chamber 720 for the protection of the store (not shown in FIG. 7) and the vehicle from which it is being launched, as further explained below with reference to FIGS. 9A-9D.

Rigidity of the flap 730 and the flat spring 732 may be selected based on information about the anticipated loads that may be expected to impact the stores such as fluid force and fluid velocity as applied to a store of a given shape and size. In one embodiment, the size and rigidity of the flat spring 732 are selected to apply enough resistance to the forces acting on the store to prevent the flap 730 from striking the aft end 714 of the launch chamber 720. Although the flap 730 may engage a significant part of a surface of the store to distribute energy from such an impact over the surface of the store, it still may be desirable to prevent the flap 730 from striking the end of the launch chamber 720 to avoid the impact entirely. In a particular illustrative embodiment where the store includes a sonobuoy, the flap 730 may be formed of a metal, such as stainless steel. In this embodiment, the flap 730 may be between nine and seventeen inched long and may have a thickness of 0.09 inches. The flap 730 may be shaped to have a cross-section approximating one-third of a circle or, in other words, a circular arc of about 120 degrees. The flat spring 732 also may be formed of a metal, such as stainless steel, that is configured to flex to enable movement of the flap 730. To provide a desired resistance, in a particular embodiment, the flat spring may be approximately 0.37 inches thick, 2.1 inches wide, and 8 inches long.

Alternatively or additionally, the launch system 700 may include a snubber 716 made from silicone, rubber, or another flexible, energy-absorbing material. The snubber 716 may be mounted on the aft end 714 of the launch chamber 720 (as shown in FIG. 7) or to a back of the flap 730 (e.g., away from a side configured to receive the store).

Figure 8:
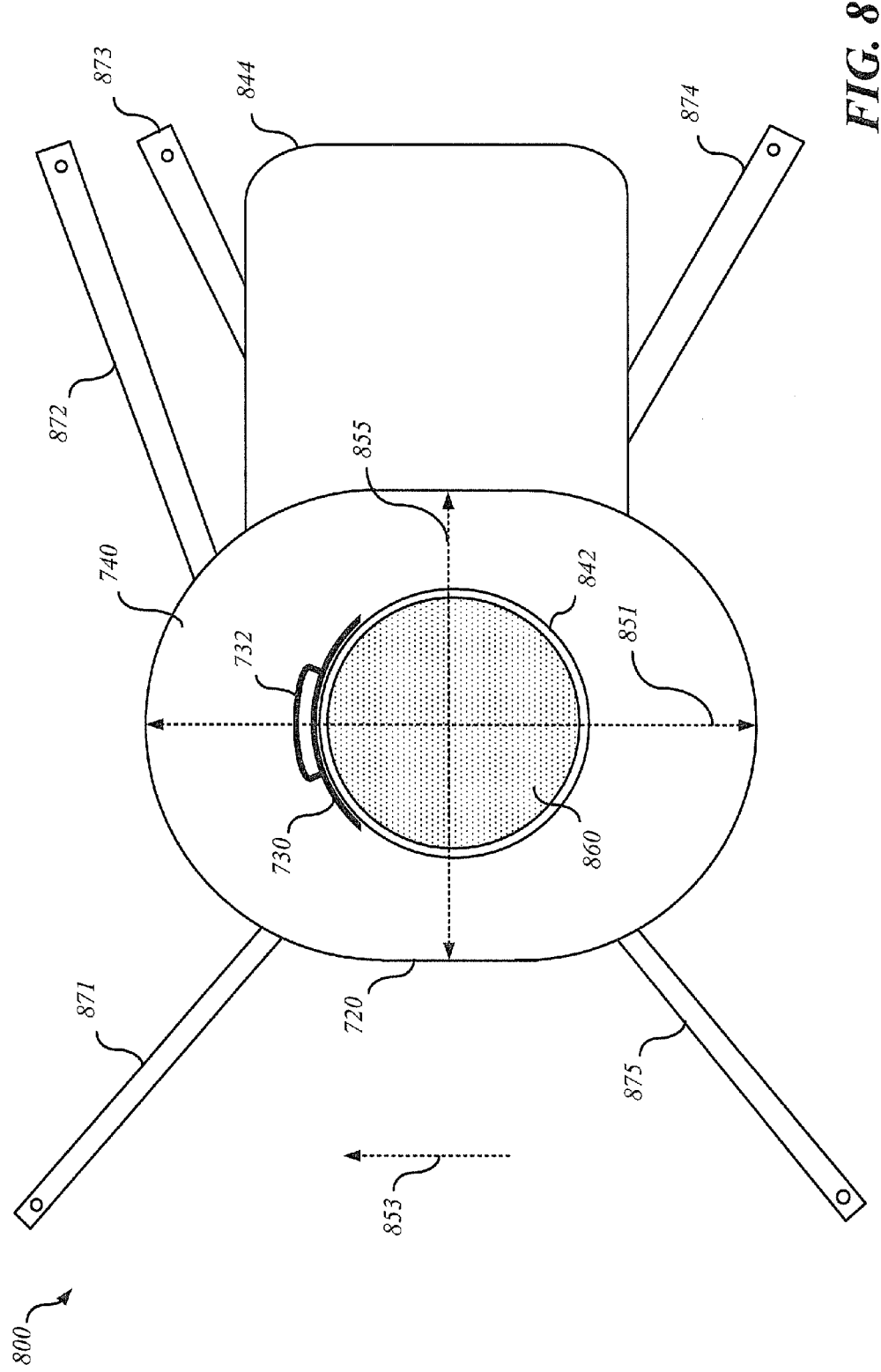
FIG. 8 is a cross-sectional top view of the exemplary stores launch tube of FIG. 7.

Referring now to FIG. 8, a top cross-sectional view of a launch chamber 800 is shown. That is, FIG. 8 illustrates a cross-section of the top portion of the launch chamber 720 of the launch system 700 of FIG. 7. The interface fitting 740 mates an opening 842 from the upper launch tube 750 to the launch chamber 720. The launch chamber 720 is shown as having an oval cross-section to permit rotation of a store 860 as the store 860 is launched into a fluid outside the hull of the vehicle, as further described with reference to FIGS. 9A-9D. In other words, a length 851 of the launch chamber 720 between the forward end and the aft end of the launch chamber 720 and parallel to a fore-to-aft ambient fluid flow 853 is larger than a width 855 of the launch chamber 720 to enable some rotation of the store 860 when a first end of the store 860 contacts the ambient fluid flow 853. The interface fitting 740 may include a gate valve interface fitting to engage a gate value 844. Inclusion of the gate valve 844 between the upper launch tube 750 (FIG. 7) and the launch chamber 720 enables the upper launch tube 750 and other portion of an interior of a vehicle hull to be isolated from the outside atmosphere. The interface fitting 740 may be supported from or secured to the vehicle hull using a number of support struts 871-875.

The launch system may also include the flap 730 and a flexible member such as the flat spring 732. The flat spring 732 may be joined to the flap 730 at an end of the flap 730 at an upper portion of the launch chamber 720. In a particular illustrative embodiment, the flap 730 may have a shape that is substantially similar to a shape of the store 860 to facilitate the flap 730 engaging sides of the store 860. Thus, for use with a round-sided store, such as the store 860, the flap 730 has a rounded face to engage the sides of the store 860 to resist lateral movement of the store 860 transverse to a fore-to-aft flow of fluid 865 past the hull of the vehicle. As the store 860 is launched through the opening 842 from the upper launch tube 750, the store 860 engages the flap 730. As described with reference to FIGS. 9A-9D, the flap 730 may move to at least partially absorb a load resulting from the flow of fluid 865 acting on the store 860 or other forces. Movement of the flap 730 may prevent or reduce damage to the store 860, to the launch chamber 720, or the vehicle, that may result from the store 860 impacting the launch chamber 720 or another portion of the vehicle.

Referring to FIGS. 9A-9D, a series of views of a launch system 900 are depicted to illustrate operation of a cantilevered flap 930 within a launch chamber 920. Specifically, FIGS. 9A-9D are used is to show how the flap 930 may at least partially absorb a load acting on a store 960 being launched from a vehicle. As shown in FIG. 8, a flow of fluid relative to the hull of the vehicle (not shown in FIGS. 9A-9D) may pass from a forward-facing side of the launch system 900 to aft end 980 of the launch system 900.

Figure 9:
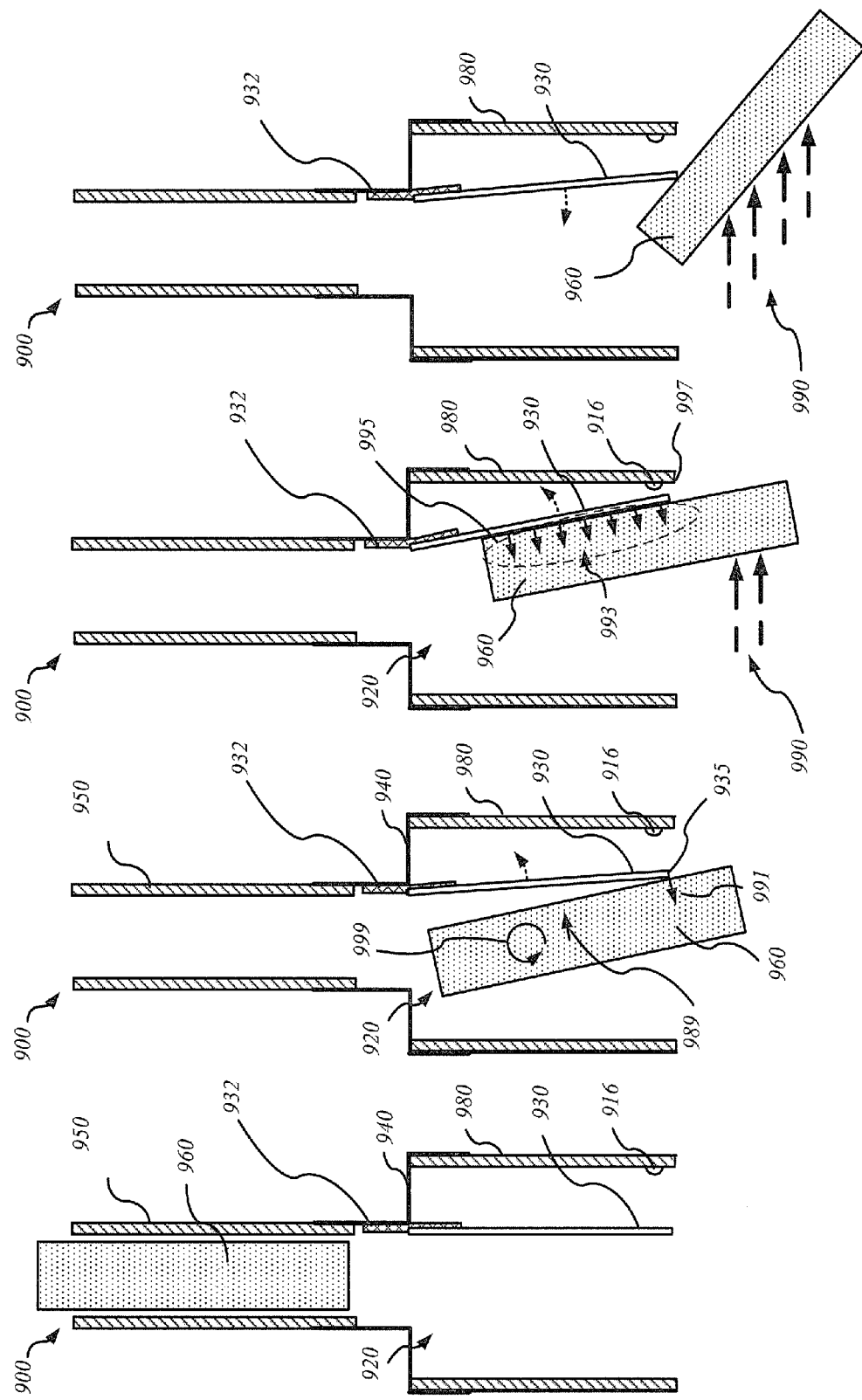
FIGS. 9A, 9B, 9C, and 9D are a series of views of the operation of the embodiment of the exemplary launch stores tube of FIGS. 7-8 as a store is being launched into a flow of fluid.

Referring to the view of the launch system 900 of FIG. 9A, the launch system 900 holds a store 960 to be passed from a launch tube 950' into a launch chamber. The launch system 900 may include a gate valve 844, which is not shown in FIGS. 9A-9D. The flap 930 may be mounted via a flat sprint 932 to an interface fitting 940 between the launch tube 950 and the launch chamber 920. The flat spring 932 and the flap 930 may be configured to allow the flap 930 to move toward an aft end 980 of the launch chamber 920 as the store 960 is being launched.

In a particular embodiment, the flat spring 932 and the flap 930 are configured to prevent the flap 930 from impacting the aft end 980 of the launch chamber 920, under a maximum anticipated loading. Limiting the range of movement of the flap 930 may reduce the risk of damage to the store 960 and reduce the risk of damage to the launch chamber 920 and the flap 930. Alternatively or additionally, a snubber 916 may be positioned between a side of the flap 930 opposite a side configured to receive the store 960 and a side of the launch chamber 920. If the flap 930 moves far enough to come close to contacting the side of the launch chamber 920, the flap 930 may instead contact the snubber 916. The snubber 916 may be designed to absorb some or all of the force imparted by the flap 930. The snubber 916 may be mounted on the flap 930 or on the wall of the launch chamber 920.

Referring to the view of the launch system 900 of FIG. 9B, the store 960 has passed out of the launch tube 950 into the launch chamber 920. As a result of a first force 989 acting on the store, such as, initial fluid forces (not shown in FIG. 9B) as the store 960 enters the launch chamber 920, the store 960 moves toward the aft end 980 of the launch chamber 920 and contacts the flap 930. The first force 989 acting on the store 960 and, in turn, on the flap 930, causes the flat spring 932 (and potentially the flap 930) to deform. The flap 930 thus moves toward the aft end 980 of the launch chamber 920. The movement of the flap 930 in FIG. 9B is short of reaching the snubber 916.

In FIG. 9B, the store 960 is shown as rotating (about an axis of rotation 999) relative to the launch chamber 920. As a result of the rotation of the store 960, the store 960 impacts the flap 930 only at an end 935 opposite a point at which the flap 930 is secured to the flat spring 932. The impact of the store 960 with the end 935 of the flap 930 results in a localized reaction force 991 by the flap 930 acting against the store 960. If the store 960 were to impact a rigid edge of the launch chamber 920, for example, the localized reaction force 991 may cause damage to a surface of or contents of the store 960. However, because the flap 930 is movably mounted in the launch chamber 920 via the flat spring 932, the impact of the store 960 with the end 935 of the flap 930 causes the flap 930 to move toward the aft end 980 of the launch chamber 920. The flap 930 is configured to rotate about the end coupled to the flat spring 932 when the store 960 impacts the flap 930 due to the forces applied to the store 960 by the fluid when the store 960 is launched.

Referring to the view of the launch system 900 of FIG. 9C, the store 960 begins to pass out of the launch chamber 920 and into a flow of fluid (not shown in FIG. 9C). A fluid load 990 acting on the store 960 forces the store 960 against the flap 930 and causes further movement of the flap 930 toward the aft end 980 of the launch chamber 920. The fluid load 990 may be greater than that of the first force 989 depicted in FIG. 9B, thereby resulting in greater deformation of the flap 930, the flat spring 932, or both.

In the example of FIG. 9C, the flap 930 moves to or nearly to the snubber 916 on the aft end 980 of the launch chamber 920. As the flap 930 moves, the flap 930 continues to engage and support the store 960, to inhibit impact between the store 960 and the launch chamber 920 or another portion of the vehicle. As the fluid load 990 drives the store 960 against the flap 930, a reaction force 993 is exerted by the flap 930 against the store 960. The reaction force 993 is distributed across a portion of a store surface 995 where the store 960 is in contact with the flap 930. Distributing the reaction force 993 over the portion of the store surface 995 may prevent the reaction force 993 from damaging the store 960. In addition, movement of the flap 930 and the flat spring 932 at least partially absorbs the load caused by the fluid load 990 acting on the store 960. By contrast, if the fluid load 990 were to drive the store against a rigid, unmoving edge 9975 of the launch chamber 920, the reaction force 993 would not be distributed over the portion of the surface 995. The reaction force 993 would thus be concentrated against a small part of the store 960 impacting the edge 997 of the launch chamber 920. Such concentration of the reaction force 993 against a small portion of the surface of the store 960 may be more likely to cause damage to the store 960.

As shown in FIG. 9C, as the store 960 engages the flow of fluid, portions of the store 960 may receive a greater portion of the fluid load 990, thereby causing the store 960 to rotate. Nonetheless, rotational movement of the flap 930 about a point at or near the flat spring 932 enables the flap 930 to continue to engage the store 960 as the store 960 rotates.

Note that the flap 930 is not configured to prevent rotation of the store 960 as the store 960 exits the launch chamber 920. An object of movably mounting the flap 930 in the launch chamber is to prevent an impact between the store and a rigid, unyielding part of the launch system 900 or the vehicle as a result of the rotation of the store 960. The fluid load 990 acting on the store 960 may tend to force the store 960 to rotate. An object of the movably mounted flap 930 is to prevent the rotation of the store 960 from resulting in an impact that may damage the store 960.

Referring to the view of the launch system 900 of FIG. 9D, the store 960 begins to move away from the launch chamber 920. The store 960 may continue to rotate under the influence of the fluid load 990. As the store 960 begins to move away from the launch chamber 920, the load acting on the flap 930 and the flat spring 932 via the store 960 is reduced. As the load is reduced, the flap 930 begins to move away from the aft end 980 of the launch chamber 920 toward a pre-launch position (e.g., the original position of the flap 930 shown in FIG. 9A). The flap 930 and the flat spring 932 thus begin to resume their undeformed shapes and configurations.

Figure 10:
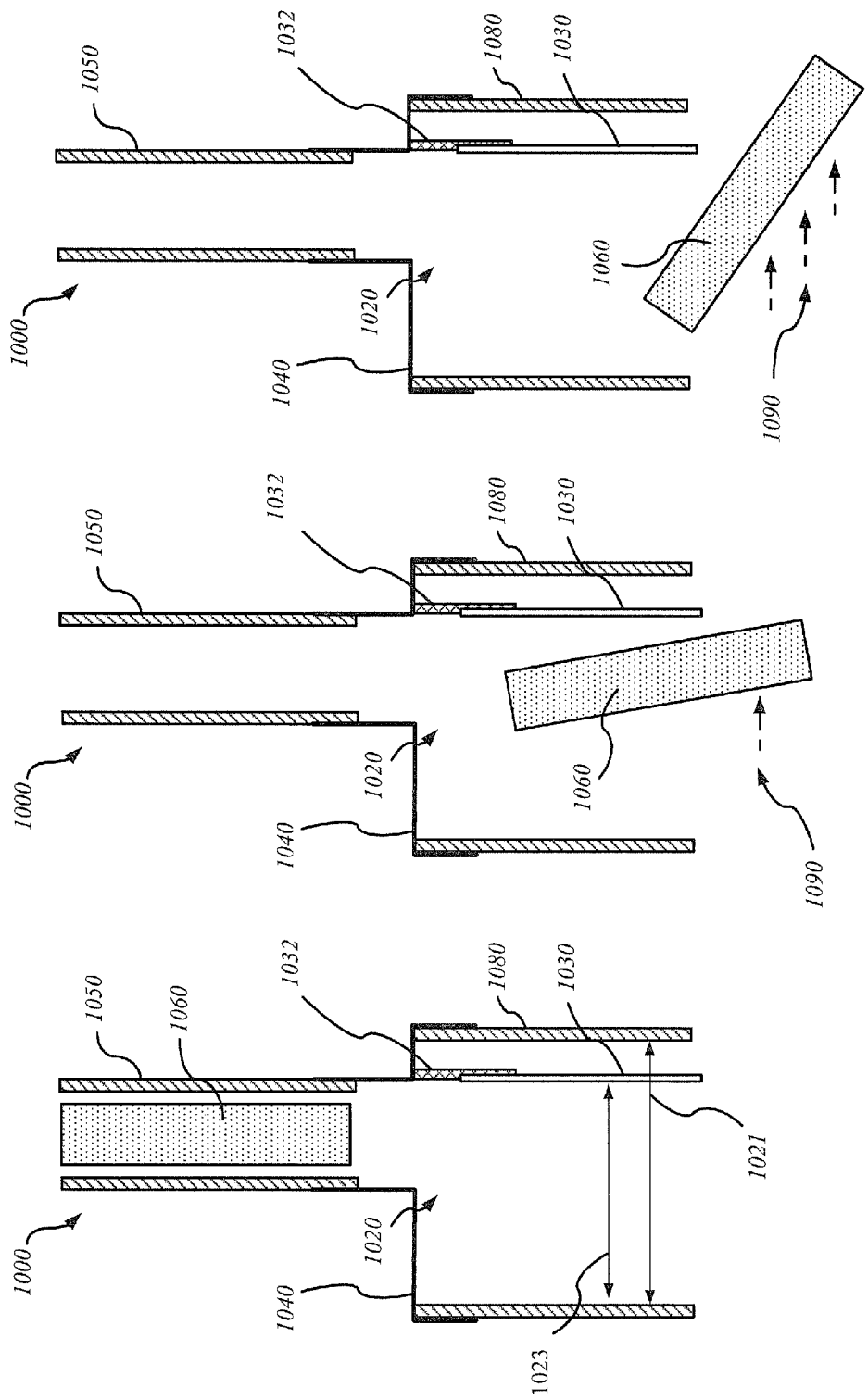
FIGS. 10A, 10B, and 10C are views of the operation of another embodiment of a stores tube as a store is being launched into a flow of fluid.

Referring to FIGS. 10A, 10B, and 10C, another embodiment of a launch system 1000 includes a launch chamber 1020 shaped to potentially enable a store 1060 to be launched without the store 1060 contacting a flap 1030. As a result of fluid flow density, fluid flow speed, relative velocity between a vehicle and a fluid, and other circumstances, a fluid load 1090 acting on the store 1060 may enable the store 1060 to be launched without engagement and support of the flap 1030.

Referring to the launch system 1000 of FIG. 10A, a launch tube 1050 is coupled via an interface fitting 1040 to a launch chamber 1020. The flap 1030 is mounted to a structure in the launch chamber 1020, such as the interface fitting 1040, via a flat spring 1032. The launch chamber 1020 has an overall length 1021 parallel to the flow of fluid relative to the launch system 1000. The length 1021 may be selected to accommodate rotation of the store 1060 without the store 1060 engaging the flap 1030. In FIGS. 10A, 10B, and 10C, a length 1023 of the launch chamber 1020 forward of the flap 1030 comprises a disproportionate share of the overall length 1021 of the launch chamber 1020. Regardless of how the overall length 1021 may be apportioned, the overall length 1021 may be selected to permit launch of a store 1060 without the store 1060 impacting the flap 1030 or any part of the launch system 1000.

Referring to FIG. 10B, after the store 1060 has passed out of the launch tube 1050 and beyond the interface fitting 1040 into the launch chamber 1020, the store 1060 may be subjected to the fluid load 1090. As previously described, however, the fluid load 1090 may not result in the store 1060 being pressed against the flap 1030. For example, the store 1060 may be launched from a vehicle that is not moving relative to a flow of ambient fluid, such as a hovering helicopter, or such as a boat or submarine that is not moving relative to an ocean current or that the vehicle is moving slowly relative to an ambient flow of fluid. In such cases, the fluid load 1090 may not arise to a level that forces the store 1060 against the flap 1030. In such a case, the store 1060 may rotate in the launch chamber 1020 as a result of the fluid load 1090 or as a result of buoyancy of the store 1060 relative to the fluid (not shown in FIG. 10B). The store 1060 may not contact the flap 1030.

Referring to FIG. 10B, the store 1060 passes out of the launch chamber 1020. As a result of the movement of the store 1060, the store 1060 may clear the launch chamber 1020 without contacting the flap 1030 at all. The flap 1030 may be present to protect the store 1060, the launch chamber 1020, or the vehicle from impacts that may result when the fluid load 1090 drives the store 1060 toward a side of the launch chamber 1020 or another portion of the vehicle. In such cases, the flap 1030 and the flat spring 1032 may operate as described with reference to FIGS. 9A-9D to absorb at least a portion of the fluid load 1090 applied to the store 1060. However, if the fluid load 1090 is relatively small, the length 1021 of the launch chamber 1020 may permit rotation or other movement of the store 1060 such that the store 1060 exits the launch chamber 1020 without engaging the flap 1030 and without impacting the launch chamber 1020 or another portion of the vehicle.

Figure 11:
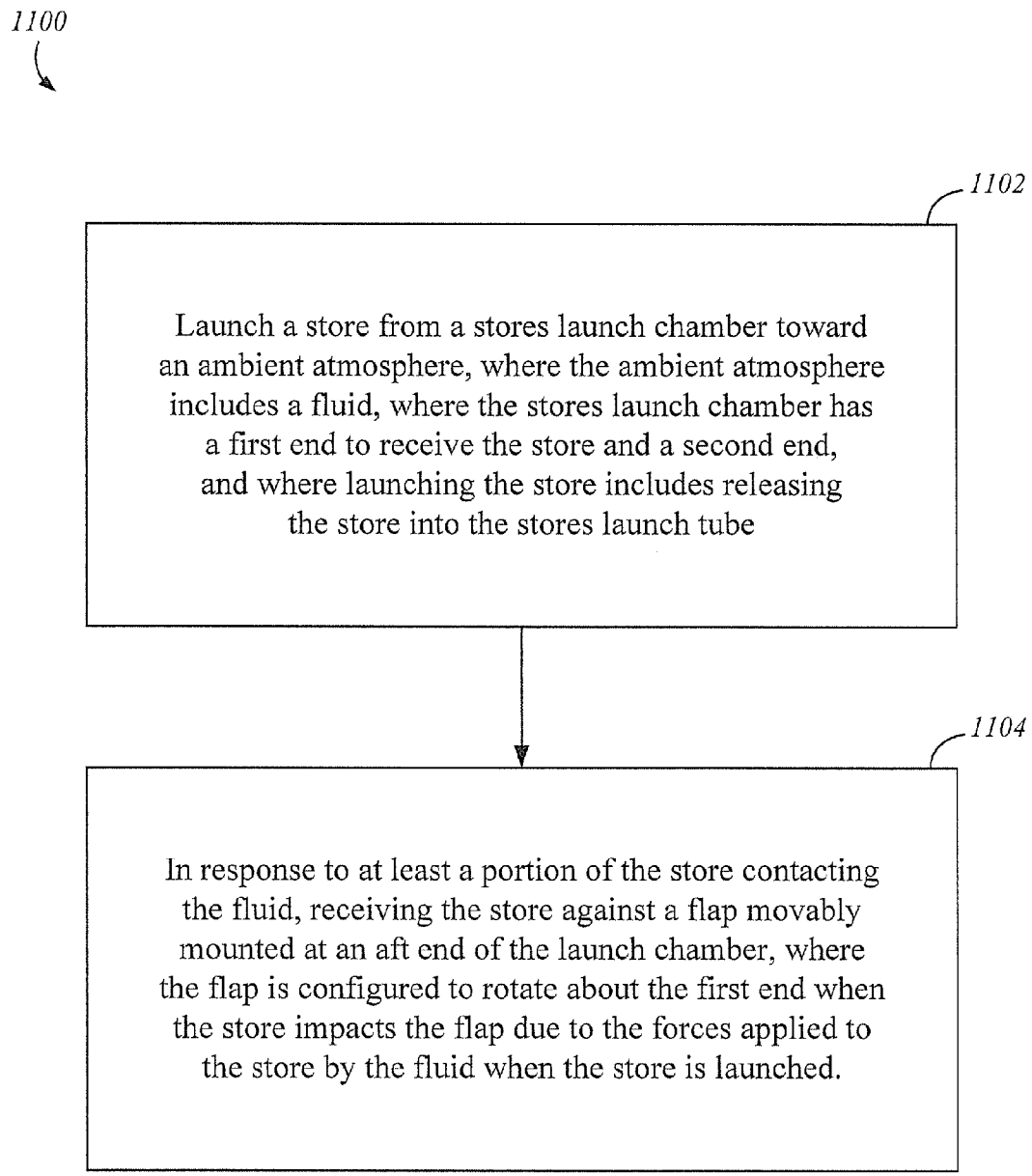
FIG. 11 is a flow diagram of a particular illustrative embodiment of a method of launching a store.

FIG. 11 is a flow diagram of a particular illustrative embodiment of a method 1100 for launching a store. The store may be launched from a stores launch chamber toward an ambient atmosphere (e.g., outside a hull of a moving vehicle), at 1102. The ambient atmosphere includes a fluid. The stores launch chamber has a first end to receive the store and a second end. Launching the store includes releasing the store into the stores launch tube. For example, in FIG. 9A, the stores launch chamber 920 has a first end adjacent the interface fitting 940 and a second end opposite the interface fitting 940. The launch tube 950 enables the store 960 to pass from an interior of the vehicle (not shown in FIG. 9A) to the launch chamber 920.

In response to at least a portion of the store contacting the fluid, the store is received against a flap movably mounted at an aft end of the launch chamber, at 1104. The flap at least partially absorbs a load imparted to the store by a flow of the fluid in the ambient atmosphere. For example, in FIG. 9C, the fluid load 990 acting on the store 960 causes the flap 930 to move toward the aft end 980 of the launch chamber 920. The flap 930 is configured to rotate about the end coupled to the flat spring 932 when the store 960 impacts the flap 930 due to the forces applied to the store 960 by the fluid when the store 960 is launched.

Figure 12A:
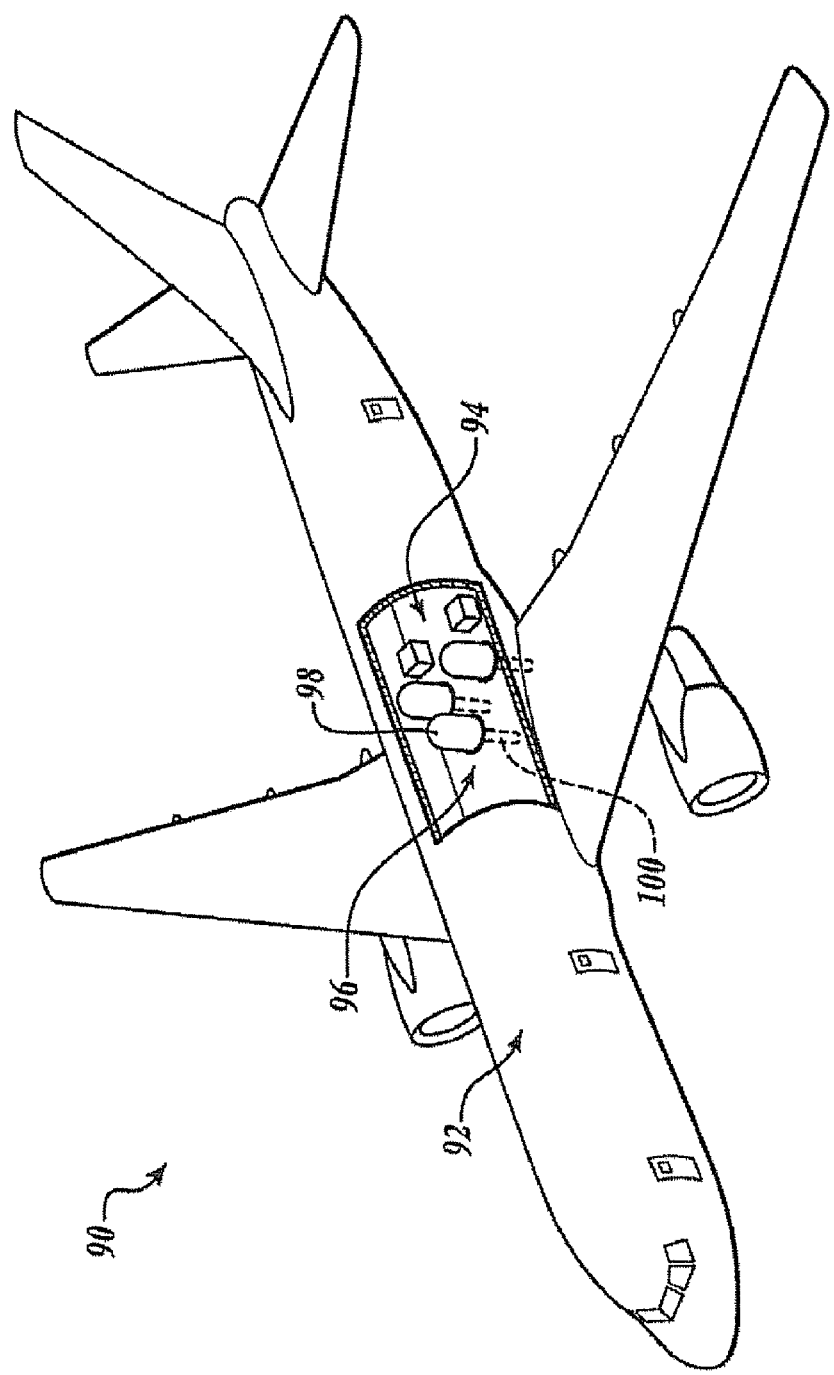
FIGS. 12A, 12B, and 12C illustrate vehicles that include an exemplary stores launch tube.
Figure 12B:
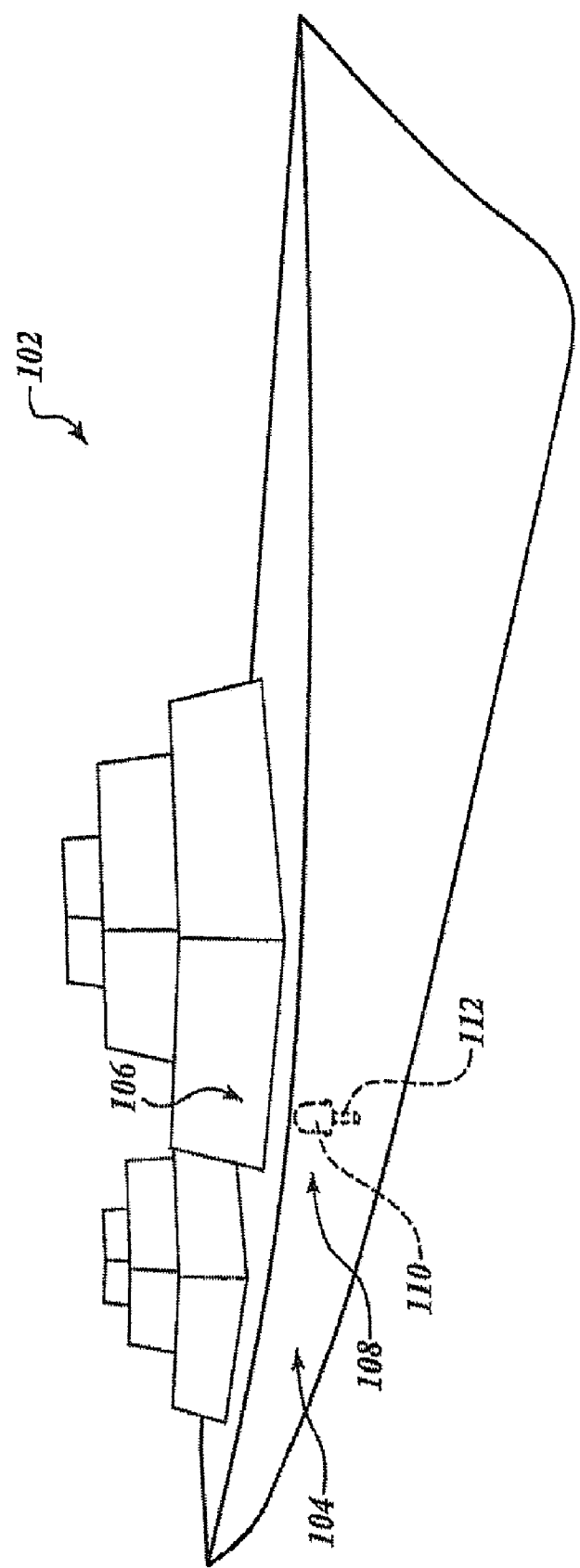
Figure 12C:
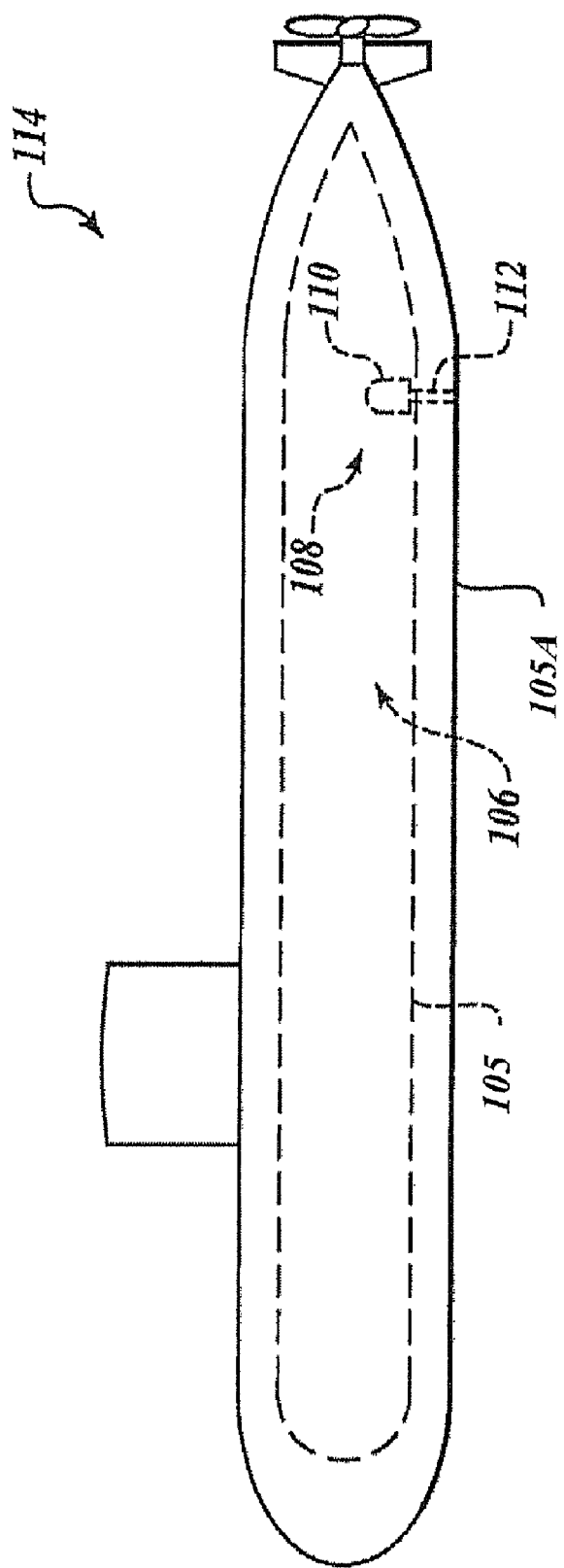

Referring now to FIGS. 12A, 12B, and 12C, any of the stores launch tubes described herein may be used in vehicles such as an aircraft, a surface ship, or a submarine. While not being intended to be limiting, the stores launch tube suitably is oriented substantially perpendicular to a fore-aft axis of the vehicle. However, it will be appreciated that in other embodiments the stores launch tube suitably is not oriented substantially perpendicular to a fore-aft axis of the vehicle and can be oriented as desired for a particular application. As shown in FIG. 12A, an aircraft 90 includes a fuselage 92 that defines a cabin 94 therein. A stores launching system 96, such as a sonobuoy launching system, includes a stores launcher 98, such as a sonobuoy launcher, provided in the cabin 94 and a load-reducing stores launch tube 100, such as a sonobuoy launch tube, operatively coupled to the stores launcher 98 to receive therefrom a store, such as a sonobuoy, and then to eject the store. The load-reducing stores launch tube 100 suitably can include any of the exemplary stores launch tubes described above.

As shown in FIG. 12B, a surface ship 102 includes a hull 104 that defines a cabin 106 therein. A stores launching system 108, such as a sonobuoy launching system or a countermeasures launching system, includes a stores launcher 110, such as a sonobuoy launcher or a countermeasures launcher, provided in the cabin 106 and a load-reducing stores launch tube 112, such as a sonobuoy launch tube or a countermeasures launch tube, operatively coupled to the stores launcher 110 to receive therefrom a store, such as a sonobuoy or a countermeasure, and then to eject the store. The load-reducing stores launch tube 112 suitably can include any of the exemplary stores launch tubes described above.

As shown in FIG. 12C, a submarine 114 includes a pressure hull 105 that defines a cabin 106 therein. An outer (non-pressure) hull 105A defines an outer mold line. A stores launching system 108, such as a sonobuoy launching system or a countermeasures launching system, includes a stores launcher 110, such as a sonobuoy launcher or a countermeasures launcher, provided in the cabin 106 and a load-reducing stores launch tube 112, such as a sonobuoy launch tube or a countermeasures launch tube, operatively coupled to the stores launcher 110 to receive therefrom a store, such as a sonobuoy or a countermeasure, and then to eject the store. The load reducing stores launch tube 112 suitably can include any of the exemplary stores launch tubes described above.

Figure 13:
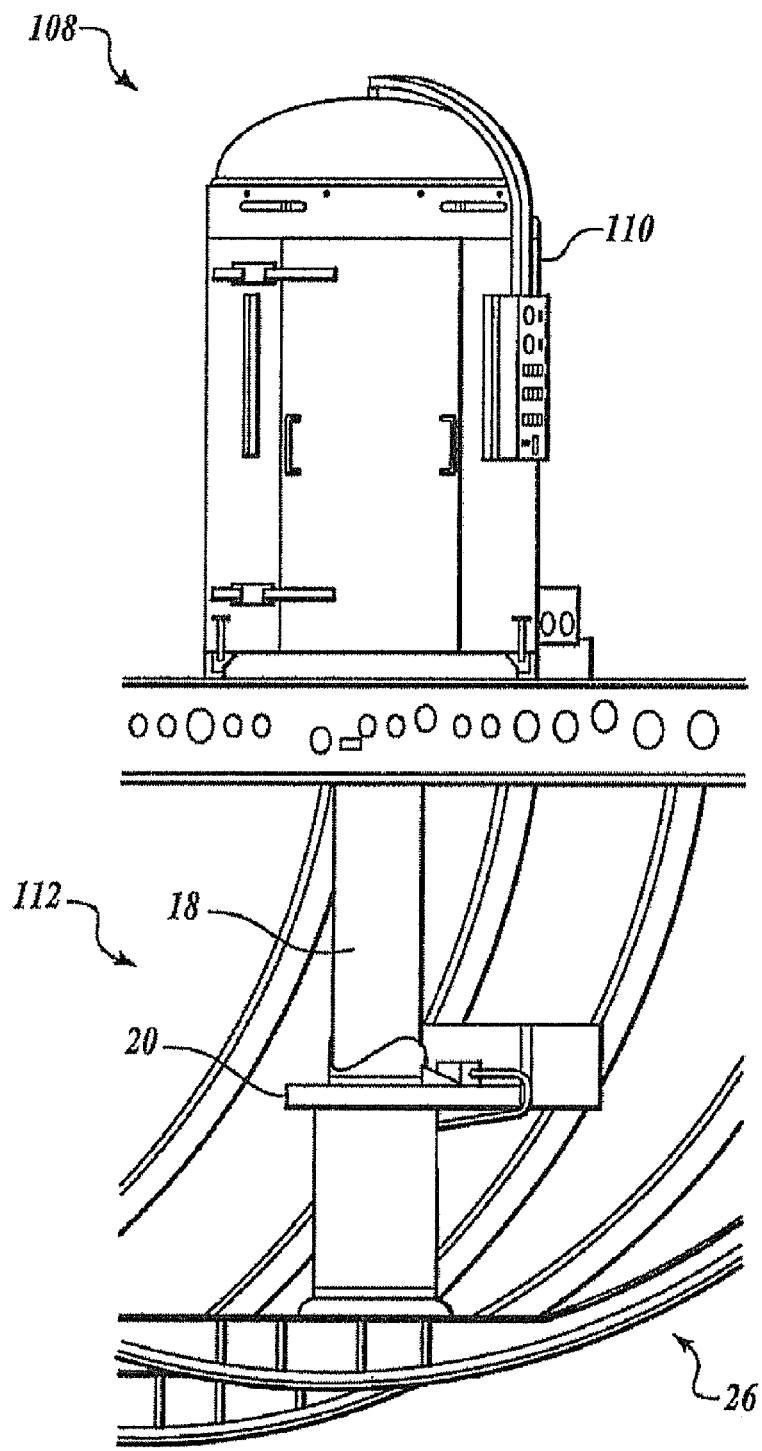
FIG. 13 illustrates an exemplary stores launch system.

Referring now to FIG. 13, the stores launching system 108 includes the stores launcher 110. The stores launcher 110 can be any suitable, known stores launcher. Given by way of non-limiting example, the stores launcher 110 may be a rotary sonobuoy launcher as described in U.S. Pat. No. 7,093,802 or a radial sonobuoy launcher as described in U.S. Pat. No. 6,679,454, or any well-known single-load stores launcher, such as a countermeasures launcher. The stores may include a sonobuoy, a countermeasure, a smoke canister, a sound underwater signal (SUS) canister, or other type of store as desired.

While a number of exemplary embodiments and aspects have been illustrated and discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their scope.

What is claimed is:

1. An apparatus for launching a store comprising:
a launch chamber having a first portion configured to receive a store and a second portion configured to be positioned over an opening in a hull of a vehicle, the launch chamber having a forward end and an aft end; and
a flap positioned a distance from the aft end of the launch chamber, wherein the flap has an first end rotatably mounted proximate to the first portion of the launch chamber and has a second end extending toward the second portion of the launch chamber, and wherein the flap is configured to rotate about the first end when the store impacts the flap due to forces applied to the store by an ambient fluid when the store is launched.

2. The apparatus of claim 1, wherein a length of the launch chamber between the forward end and the aft end is larger than a width of the launch chamber transverse to a flow of the ambient fluid to enable the store to rotate inside the launch chamber when the store contacts the ambient fluid.

3. The apparatus of claim 2, wherein a cross-section of the launch chamber is substantially oval in shape.

4. The apparatus of claim 2, wherein the launch chamber has a length parallel to the flow of the ambient fluid that enables the store to rotate as the store is launched into the flow of the ambiant fluid without engaging the flap.

5. The apparatus of claim 1, wherein the flap is configured to present a surface to engage a side of the store and to resist movement of the store in a direction transverse to a movement of the store into the ambient fluid.

6. The apparatus of claim 5, wherein the flap has a curved shape substantially similar to a shape of the store.

7. The apparatus of claim 5, wherein a reaction force between the flap and the store is distributed across a portion of a surface of the store in contact with the flap.

8. The apparatus of claim 1, wherein the flap is rotatably coupled via a flexible member to a structure at the first portion of the launch chamber, wherein a first end of the flexible member is secured to the structure at the first portion of the launch chamber and a second end of the flexible member is secured to the flap.

9. The apparatus of claim 8, wherein the flexible member includes a flexible metal portion that flexes to enable movement of the flap.

10. The apparatus of claim 8, wherein the flexible member is configured to inhibit movement of the second end of the flap into contact with the aft end of the launch chamber.

11. The apparatus of claim 1, wherein the flap is flexible between the first end and the second end, and wherein the flap is configured to rotate about the first end when the store impacts the flap due to the forces applied to the store by the ambient fluid when the store is launched.

12. A vehicle, comprising:
a hull;
a stores launcher configured to launch at least one store;
a launch tube configured to receive the store from the stores launcher;
a launch chamber having a first portion configured to receive the store from the launch tube and a second portion configured to be positioned over an opening in the hull, the launch chamber having a forward end and an aft end; and
a flap positioned a distance from the aft end of the launch chamber, wherein the flap is movably mounted within the launch chamber, and the flap is configured to rotate about a first end of the flap when the store impacts the flap due to forces applied to the store by a fluid when the store is launched.

13. The vehicle of claim 12, wherein the flap includes a cantilevered flap, and wherein the flap is configured to rotate about the first end when the store impacts the flap due to the forces applied to the store by the fluid when the store is launched.

14. The vehicle of claim 13, wherein the cantilevered flap includes the first end that is flexibly mounted to the first portion of the launch chamber to permit a second end of the flap to move toward the aft end of the launch chamber in response to force exerted on the flap by the store when the store is launched.

15. The vehicle of claim 12, wherein the flap is configured to resist movement of the store in a direction transverse to a movement of the store into the fluid.

16. The vehicle of claim 12, wherein the stores launcher is at least partially positioned within the hull.

17. A method comprising:
- launching a store from a stores launch chamber toward an ambient atmosphere, wherein the ambient atmosphere includes a fluid, wherein the stores launch chamber has a first end to receive the store and a second end open to the ambient atmosphere; and
- in response to at least a portion of the store contacting the fluid, receiving the store against a flap rotatably mounted within the stores launch chamber, wherein the flap is configured to rotate about the first end when the store impacts the flap due to forces applied to the store by the fluid when the store is launched.

18. The method of claim 17, further comprising restricting movement of the flap to prevent a load imparted to the store by a flow of the fluid in the ambient atmosphere from causing the flap to impact a side of the stores launch chamber.

19. The method of claim 17, wherein the stores launch chamber is mounted at least partially within an interior of a moving vehicle and is coupled to a hull of the moving vehicle to enable launch of the store from the moving vehicle.

20. The method of claim 17, wherein the store includes a sonobuoy.

* * * * *